US010504678B2

(12) United States Patent
Smith et al.

(10) Patent No.: US 10,504,678 B2
(45) Date of Patent: Dec. 10, 2019

(54) REMOTE ACCESS PULL RIG

(71) Applicant: S&C Electric Company, Chicago, IL (US)

(72) Inventors: Richard George Smith, North Aurora, IL (US); Christopher Lettow, Wheeling, IL (US)

(73) Assignee: S&C Electric Company, Chicago, IL (US)

( * ) Notice: Subject to any disclaimer, the term of this patent is extended or adjusted under 35 U.S.C. 154(b) by 355 days.

(21) Appl. No.: 15/347,256

(22) Filed: Nov. 9, 2016

(65) Prior Publication Data

US 2017/0133187 A1 May 11, 2017

Related U.S. Application Data

(60) Provisional application No. 62/253,925, filed on Nov. 11, 2015.

(51) Int. Cl.
*B23P 19/00* (2006.01)
*H01H 85/02* (2006.01)

(52) U.S. Cl.
CPC .... *H01H 85/0208* (2013.01); *Y10T 29/53283* (2015.01)

(58) Field of Classification Search
CPC .. H01H 85/0208; H01H 85/36; H01H 31/006; H01H 9/102; Y10T 408/93; Y10T 29/53257
USPC ......... 29/758, 54, 566.4, 721, 729, 757, 764
See application file for complete search history.

(56) References Cited

U.S. PATENT DOCUMENTS

| | | | | |
|---|---|---|---|---|
| 6,691,985 B1 * | 2/2004 | El Haddad | H02G 1/08 | |
| | | | 254/134.3 FT | |
| 7,360,801 B2 * | 4/2008 | Breslin | B62D 63/064 | |
| | | | 292/11 | |

* cited by examiner

*Primary Examiner* — Thiem D Phan

(57) ABSTRACT

A remote access pull rig for opening a fuse associated with a power distribution system is provided. The remote access pull rig includes a base adapted to be coupled to the fuse and a first leg coupled to the base. The first leg includes a first clamp. The remote access pull rig also includes a second leg coupled to the base. The first leg and the second leg extend along a longitudinal axis of the remote access pull rig, and the second leg including a second clamp. The remote access pull rig includes an arm coupled to the base. The arm extends along an axis transverse to the longitudinal axis and includes a third clamp.

3 Claims, 25 Drawing Sheets

REMOTE ACCESS PULL RIG

CROSS-REFERENCE TO RELATED APPLICATION

This application claims the benefit of U.S. Provisional Application No. 62/253,925, filed on Nov. 11, 2015. The relevant disclosure of the above application is incorporated herein by reference.

TECHNICAL FIELD

The present disclosure generally relates to power distribution systems, and more particularly relates to a remote access pull rig for use in opening a fuse associated with a power distribution system.

BACKGROUND

Electrical equipment such as electrical switchgear used in electric power distribution systems generally include one or more fuses to interrupt the electric circuit for servicing. In certain applications, such as underground and pad-mounted applications, the fuses may be mounted within an electrical housing or box and may require an application of a force to open the fuse. In addition, in some instances the fuse may move unexpectedly during opening, which may interfere with the movement of the fuse to the opened position.

Accordingly, it is desirable to provide a remote access pull rig for applying a force to open a fuse, which enables an operator or technician to open the fuse remotely in a controlled manner. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a remote access pull rig for opening a fuse associated with a power distribution system. The remote access pull rig includes a base adapted to be coupled to the fuse, and a first leg coupled to the base. The first leg includes a first clamp. The remote access pull rig also includes a second leg coupled to the base. The first leg and the second leg extend along a longitudinal axis of the remote access pull rig, and the second leg includes a second clamp. The remote access pull rig also includes an arm coupled to the base. The arm extends along an axis transverse to the longitudinal axis and includes a third clamp.

Also provided is a remote access pull rig for opening a fuse associated with a power distribution system. The remote access pull rig includes a base having a rope funnel adapted to receive a rope coupled to the fuse. The remote access pull rig includes a first leg coupled to the base, and the first leg includes a first clamp. The remote access pull rig also includes a second leg coupled to the base. The first leg and the second leg extend along a longitudinal axis of the remote access pull rig, and the second leg includes a second clamp. The remote access pull rig also includes an arm that extends along an axis transverse to the longitudinal axis. The arm is coupled to the base such that a position of the arm is adjustable along the axis, and the arm includes a third clamp.

Further provided according to various embodiment is a remote access pull rig for opening a fuse associated with a power distribution system. The remote access pull rig includes a base having a rope funnel adapted to receive a rope coupled to the fuse. The rope funnel is removably coupled to the base. The remote access pull rig includes a first leg coupled to the base. The first leg includes a first clamp and a pad positioned between the first leg and the first clamp. The remote access pull rig also includes a second leg coupled to the base. The first leg and the second leg extend along a longitudinal axis of the remote access pull rig. The second leg includes a second clamp and a second pad. The second pad is coupled to the first leg, and the second clamp includes a first handle, a link plate and a clamp foot. The first handle is coupled to the link plate and is coupled to the clamp foot via a link. The link plate is coupled to the second pad and the clamp foot is pivotably coupled to the link plate such that movement of the handle pivots the clamp foot. The clamp foot includes an indentation that forms a line of contact for the application of a clamp force. The remote access pull rig also includes an arm that extends along an axis transverse to the longitudinal axis. The arm is coupled to the base such that a position of the arm is adjustable along the axis, and the arm includes a third clamp. The third clamp has a second handle that extends through a slot defined in the arm.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
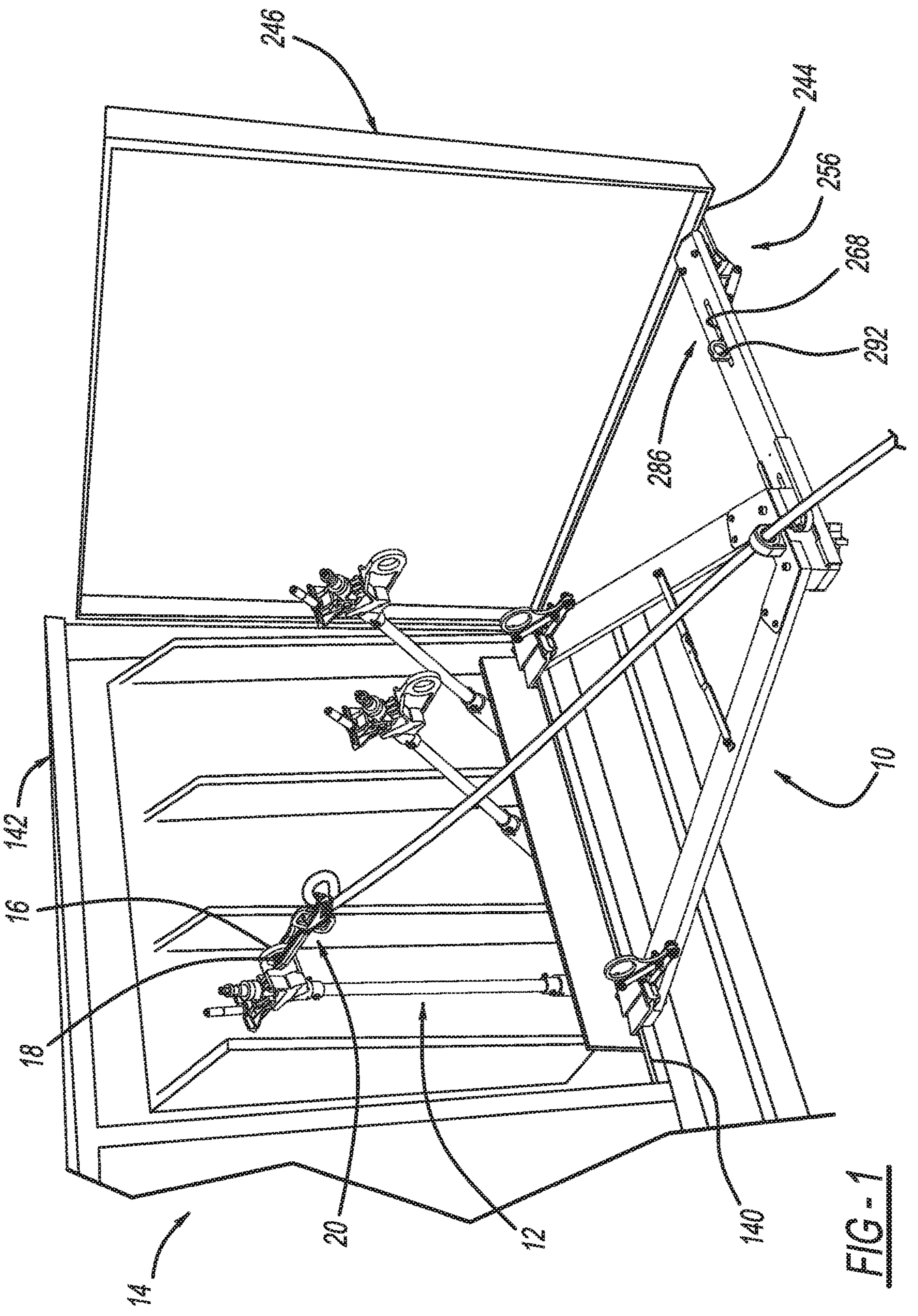
FIG. 1 is an environmental schematic illustration of a remote access pull rig for use with a fuse of a power distribution system in accordance with the present disclosure, in which the fuse is in a first, closed position.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any system that requires an apparatus to apply a force for opening a device, and that the application of the remote access pull rig to a fuse of a power distribution system described herein is merely one exemplary embodiment according to the present disclosure. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

According to various embodiments, a remote access pull rig for opening a fuse associated with a power distribution system is provided. The remote access pull rig includes a base adapted to be coupled to the fuse and a first leg coupled to the base. The first leg includes a first clamp. The remote access pull rig also includes a second leg coupled to the base. The first leg and the second leg extend along a longitudinal axis of the remote access pull rig, and the second leg including a second clamp. The remote access pull rig includes an arm coupled to the base. The arm extends along an axis transverse to the longitudinal axis and includes a third clamp.

Also provided according to the present disclosure is a remote access pull rig for opening a fuse associated with a power distribution system. The remote access pull rig includes a base including a rope funnel adapted to receive a rope coupled to the fuse. The remote access pull rig also includes a first leg coupled to the base. The first leg includes a first clamp. The remote access pull rig includes a second leg coupled to the base. The first leg and the second leg extend along a longitudinal axis of the remote access pull rig. The second leg includes a second clamp. The remote access pull rig includes an arm that extends along an axis transverse to the longitudinal axis. The arm is coupled to the base such that a position of the arm is adjustable along the axis, and the arm includes a third clamp.

Further provided is a remote access pull rig for opening a fuse associated with a power distribution system. The remote access pull rig includes a base including a rope funnel adapted to receive a rope coupled to the fuse. The rope funnel is removably coupled to the base. The remote access pull rig also includes a first leg coupled to the base. The first leg including a first clamp and a pad positioned between the first leg and the first clamp. The remote access pull rig includes a second leg coupled to the base. The first leg and the second leg extend along a longitudinal axis of the remote access pull rig, and the second leg including a second clamp and a second pad. The second pad is coupled to the first leg. The second clamp includes a first handle, a link plate and a clamp foot. The first handle is coupled to the link plate and is coupled to the clamp foot via a link. The link plate is coupled to the second pad and the clamp foot is pivotably coupled to the link plate such that movement of the handle pivots the clamp foot. The clamp foot includes an indentation that forms a line of contact for the application of a clamp force. The remote access pull rig includes an arm that extends along an axis transverse to the longitudinal axis. The arm is coupled to the base such that a position of the arm is adjustable along the axis, and the arm includes a third clamp. The third clamp has a second handle that extends through a slot defined in the arm.

With reference to FIG. 1, a remote access pull rig 10 is shown. In one example, the remote access pull rig 10 is employed to open a fuse 12 associated with a power distribution system 14. In this example, the power distribution system 14 comprises a Pad Mount Heavy Duty (PMH) pad mounted distribution system, however, the remote access pull rig 10 may be employed to open a fuse associated with any other suitable power distribution system, such as a Pad Mount Elbow (PME) pad mounted distribution system. It should be noted that only a portion of the power distribution system 14 is illustrated in FIG. 1 for clarity and understanding.

Figure 2:
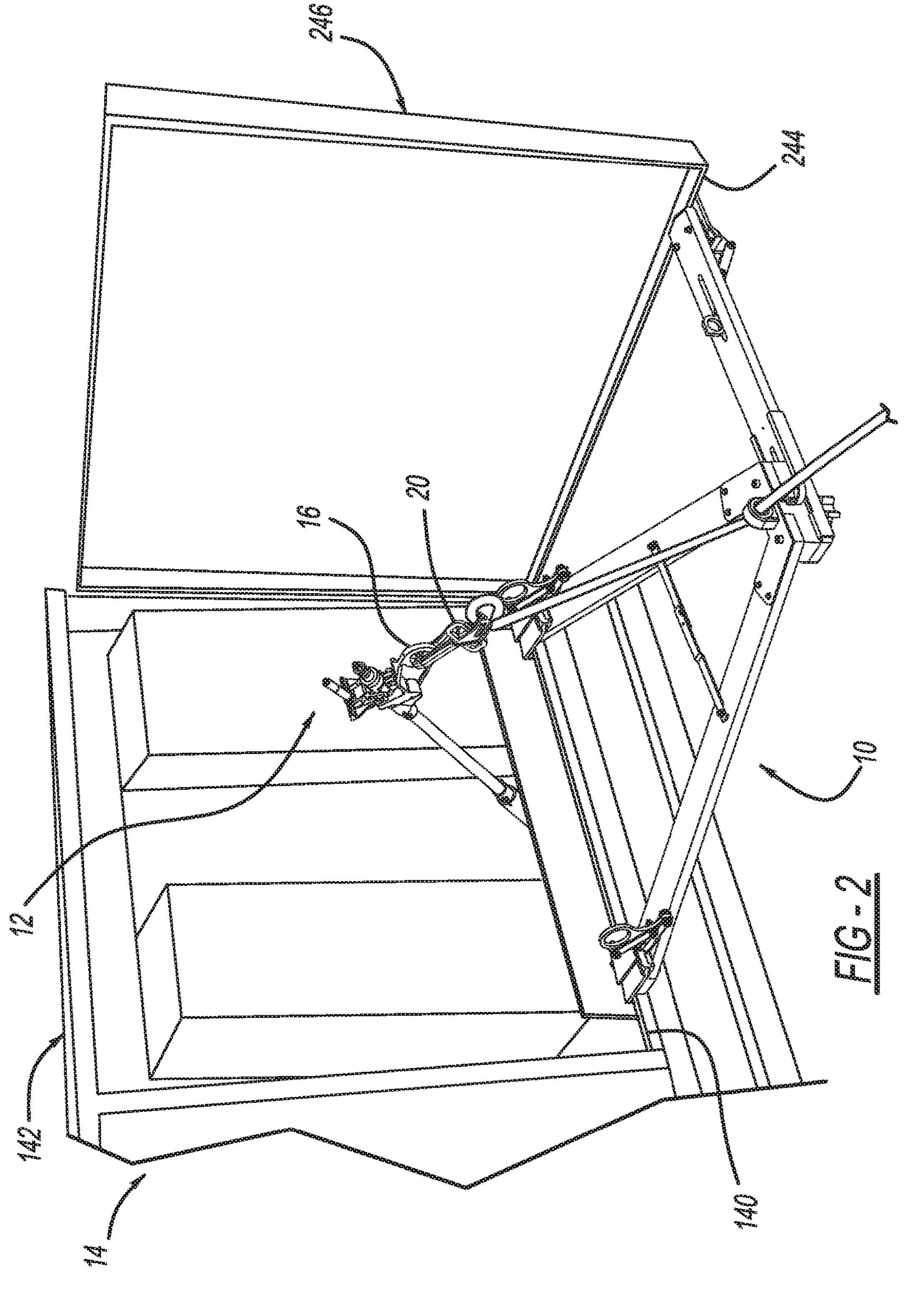
FIG. 2 is an environmental schematic illustration of the remote access pull rig of FIG. 1 being used to move the fuse to a second, open position.

In the example of FIG. 1, the fuse 12 includes a ring 16. The ring 16 is movable to interrupt an electric circuit associated with the power distribution system 14. The ring 16 defines an opening 18. Generally, the opening 18 is circular, however, the opening 18 may have any desired shape. As illustrated in FIG. 1, the remote access pull rig 10 cooperates with a shake-proof hook 20 coupled to the ring 16 of the fuse 12 to open the fuse 12. In this regard, the remote access pull rig 10 cooperates with the shake-proof hook 20 to move the fuse 12 from a first, closed position (FIG. 1) to a second, open position (FIG. 2). The shake-proof hook 20 is securely coupled to the ring 16 so that any unexpected movement of the fuse 12 while moving between the first position and the second position with the remote access pull rig 10 does not interfere with the connection between the shake-proof hook 20 and the ring 16, thereby ensuring that an operator has control of the fuse 12 during the movement of the fuse 12 between the first position and the second position. This improves the operator's ability to affect the movement of the fuse 12 between the first position and the second position. It should be noted that the use of the shake-proof hook 20 with the remote access pull rig 10 is merely exemplary, as any other suitable attachment may be formed between the fuse 12 and the remote access pull rig 10 to move the fuse 12 between the first position and the second position. As the shake-proof hook 20 is outside of the scope of this present disclosure, further details regarding the shake-proof hook 20 may be found in U.S. Application Ser. No. 62/253,895, filed on Nov. 11, 2015, and converted into non-provisional U.S. application Ser. No. 15/347,240, filed on Nov. 9, 2016, the relevant content of which is incorporated herein by reference.

Figure 3:
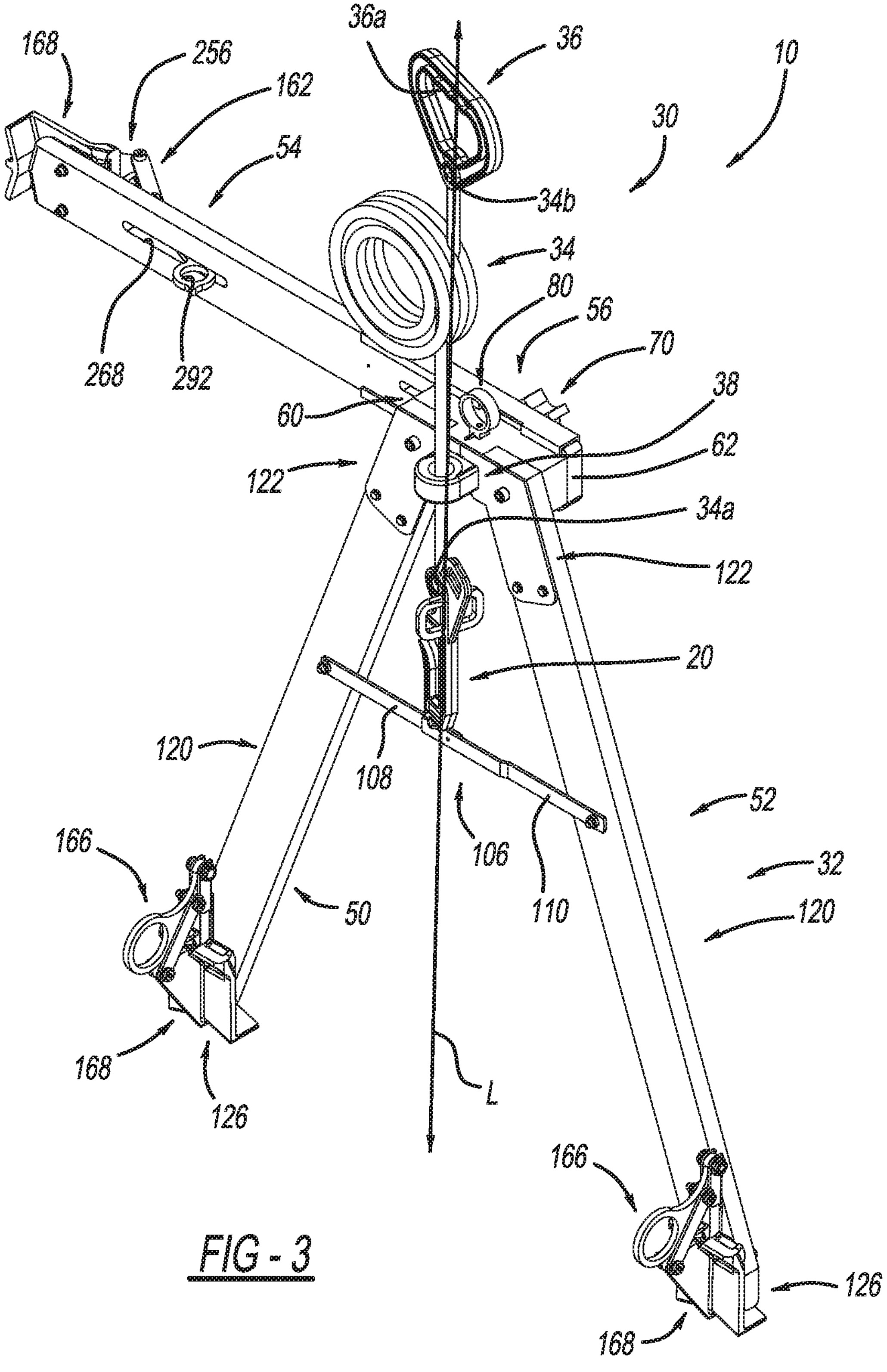
FIG. 3 is a front perspective view of the remote access pull rig of FIG. 1.
Figure 3A:
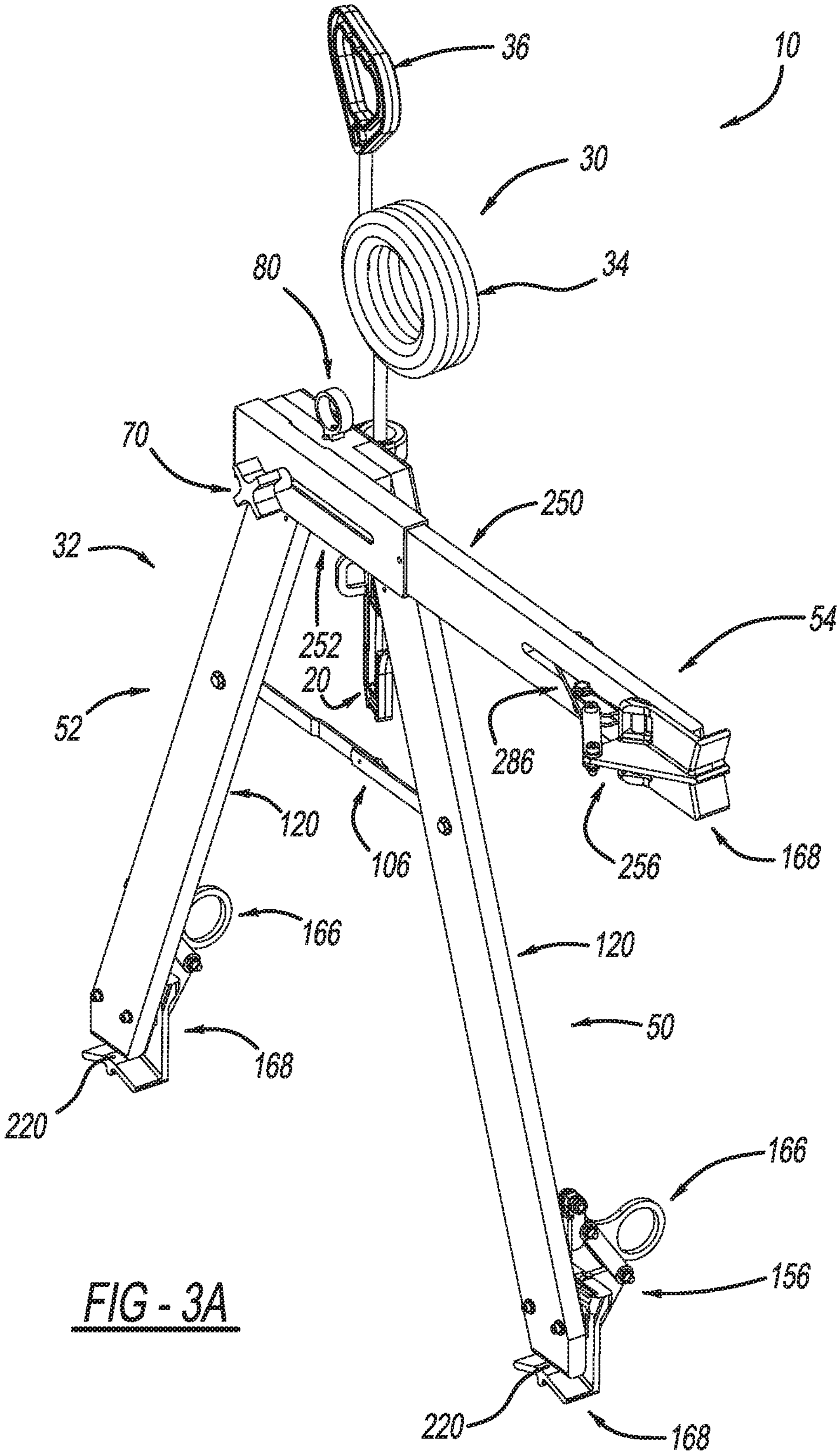
FIG. 3A is a rear perspective view of the remote access pull rig of FIG. 1.

With reference to FIG. 3, the remote access pull rig 10 is shown in more detail. As discussed above, the remote access pull rig 10 may cooperate with the shake-proof hook 20 to move the fuse 12 between the first position and the second position. In one example, the remote access pull rig 10 includes a rope assembly 30 and a rig assembly 32. Generally, the rope assembly 30 is removably attached to the rig assembly 32 to enable the attachment of the rope assembly 30 to the fuse 12 (FIGS. 1 and 2). In one example, the rope assembly 30 includes a rope 34, a handle 36 and a rope funnel 38. In certain embodiments, the rope assembly 30 may also include the shake-proof hook 20. In this example, the shake-proof hook 20 is coupled to a first end 34*a* of the rope 34, and the handle 36 is coupled to the second, opposite end 34*b* of the rope 34. Generally, each of the handle 36 and the shake-proof hook 20 are coupled to the rope 34 by tying the ends 34*a*, 34*b* of the rope 34 to each of the handle 36 and the shake-proof hook 20. The rope 34 may comprise any suitable rope, and in one example, comprises about ⅜ inches thick 8 strand plaited bi-polymer dielectric rope. For example, the rope 34 comprises Hy-Dee Brait dielectric rope commercially available from Yale Cordage of Saco, Me. In one example, the rope 34 is about 15 feet long, however, the rope 34 may have any desired length.

The handle 36 is coupled to the end 34*b* of the rope 34. The handle 36 comprises any suitable grasping surface for pulling on the rope 34, and in one example, is substantially triangular with a grip surface 36*a*. The grip surface 36*a* provides a surface for a hand of the operator to enable the operator to apply a force to the rope 34. The grip surface 36*a* may include one or more finger indentations or undulations; however, the grip surface 36*a* may also be smooth. The handle 36 is formed of a suitable electrically insulating material, and in one example, the handle 36 is formed of a suitable polymer. For example, the handle 36 is composed of polycarbonate. The handle 36 may be manufactured through any suitable technique, such as injection molding, etc. It should be noted that the handle 36 need not be formed of an electrically insulating material, but may also be formed of a metal or a metal alloy, if desired.

Figure 4:
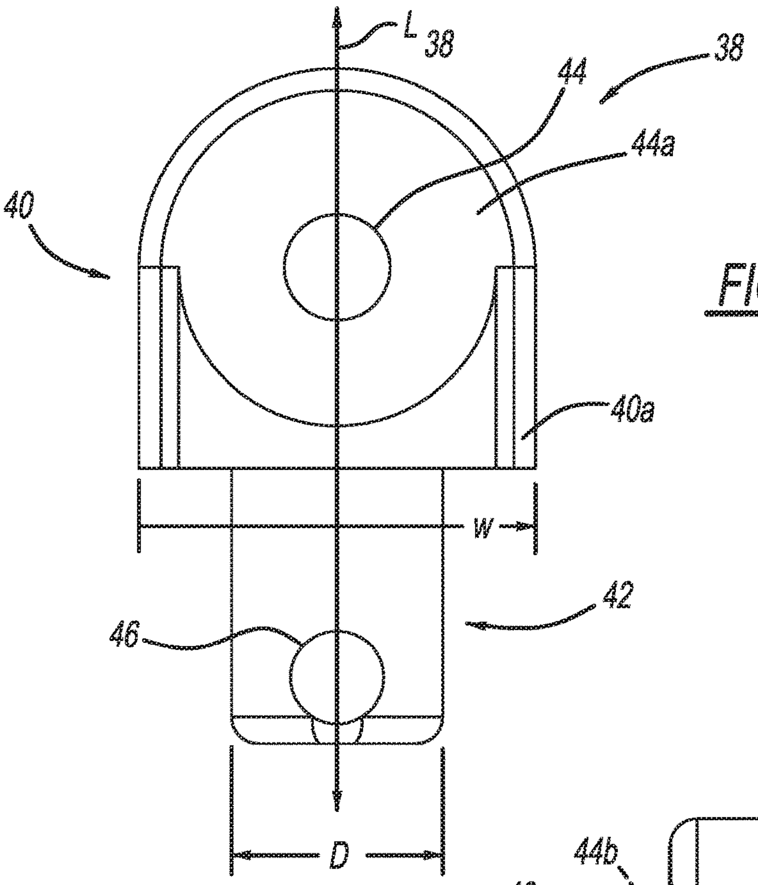
FIG. 4 is a front view of a rope funnel for use with the remote access pull rig of FIG. 1.

The rope funnel 38 couples the rope assembly 30 to the rig assembly 32, and also guides the movement of the rope 34 relative to the rig assembly 32. In one example, the rope funnel 38 is composed of a lightweight metal or metal alloy, such as aluminum, but the rope funnel 38 may also be composed of a durable polymer, if desired. Generally, the rope funnel 38 is machined; however, any suitable manufacturing method may be used to form the rope funnel 38, such as selective laser sintering, casting, etc. With reference to FIG. 4, the rope funnel 38 includes a first, funnel end 40 and a second, coupling end 42 that extend along a longitudinal axis L38. Generally, the rope funnel 38 is a monolithic or one-piece component; however, the rope funnel 38 may comprise multiple pieces coupled together.

Figure 5:
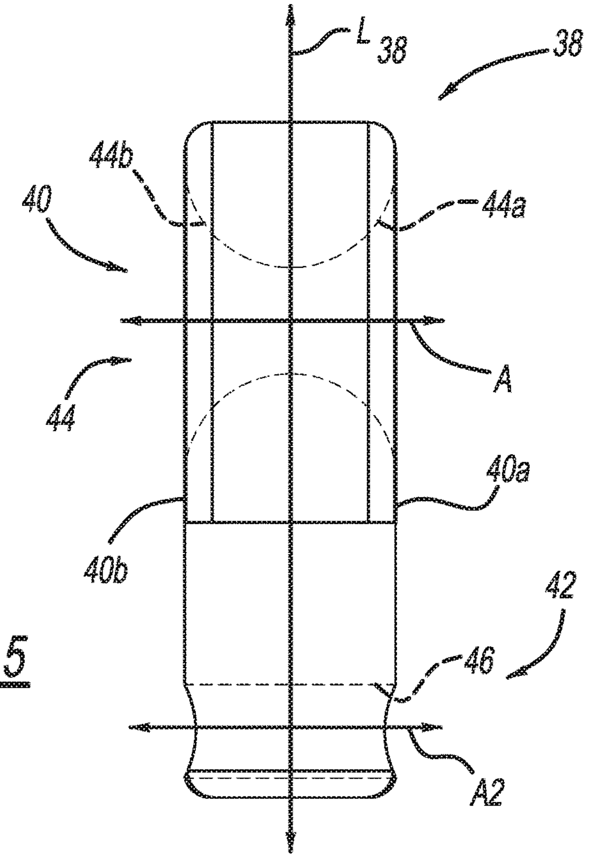
FIG. 5 is a side view of the rope funnel of FIG. 4.

The funnel end 40 receives the rope 34. In one example, the funnel end 40 defines a throughbore 44, which extends along an axis A transverse to, for example, substantially perpendicular, to the longitudinal axis L38. With reference to FIG. 5, the throughbore 44 passes through the funnel end 40 from a first side 40*a* to a second side 40*b*. In this example, the throughbore 44 includes a first tapered counterbore 44*a* and a second tapered counterbore 44*b*. The first tapered counterbore 44*a* and the second tapered counterbore 44*b* cooperate to define two funnel surfaces, which provide a generally hourglass shape for the throughbore 44. The use of two tapered counterbores 44*a*, 44*b* provides a guide for the rope 34 through the rope funnel 38, and facilitates the placement of the rope 34 at various angles relative to the rope funnel 38. The tapered counterbores 44*a*, 44*b* may have a smooth finish for interfacing with the rope 34, and may include a coating to reduce friction between the rope 34 and the throughbore 44.

The coupling end 42 extends from the funnel end 40. The coupling end 42 may be substantially cylindrical, and may have a diameter D, which may be less than a width W associated with the funnel end 40. The difference in size between the diameter D and the width W enables the coupling end 42 to be received within a portion of the rig assembly 32. It should be noted, however, that the coupling end 42 may have any desired shape to couple the coupling end 42 to the rig assembly 32. The coupling end 42 forms or defines a bore 46. The bore 46 extends along an axis A2, which is transverse to, for example, substantially perpendicular, to the longitudinal axis L38. The bore 46 is generally sized to cooperate with a portion of the rig assembly 32 to removably couple the rope funnel 38 to the rig assembly 32. It should be noted that the use of the bore 46 is merely exemplary, as a groove or feature may be used to removably couple the rope funnel 38 to the rig assembly 32.

Figure 6:
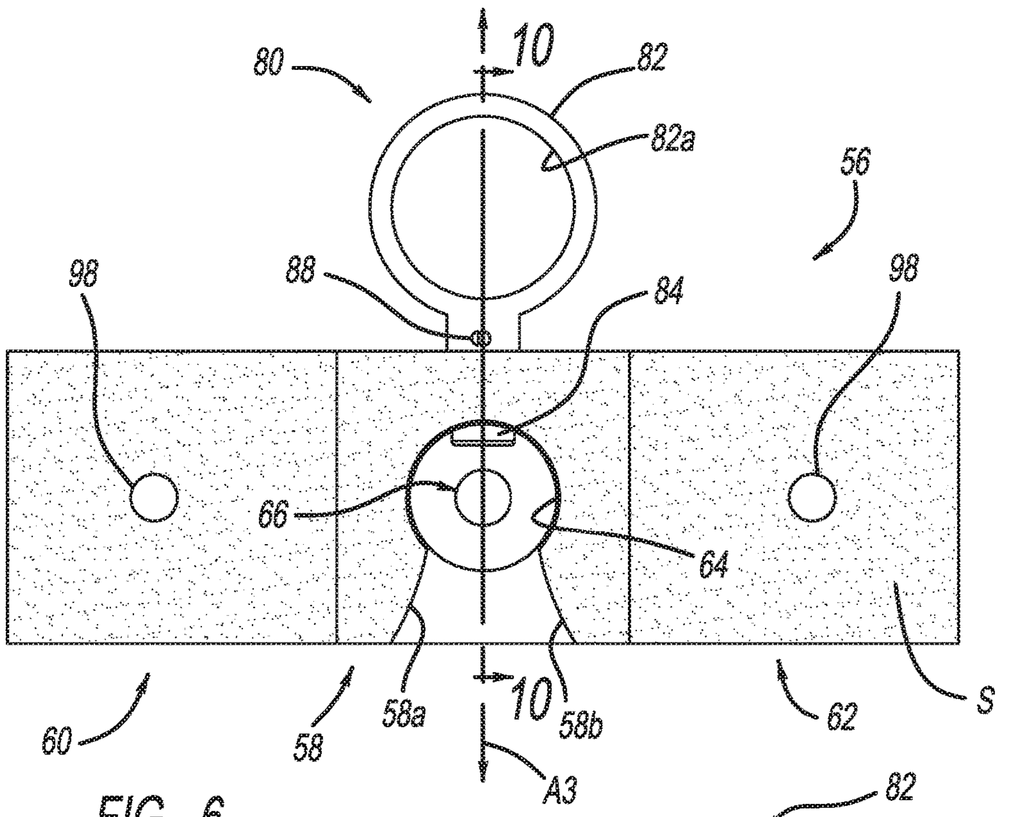
FIG. 6 is a top view of a base for use with the remote access pull rig of FIG. 1.
Figure 7:
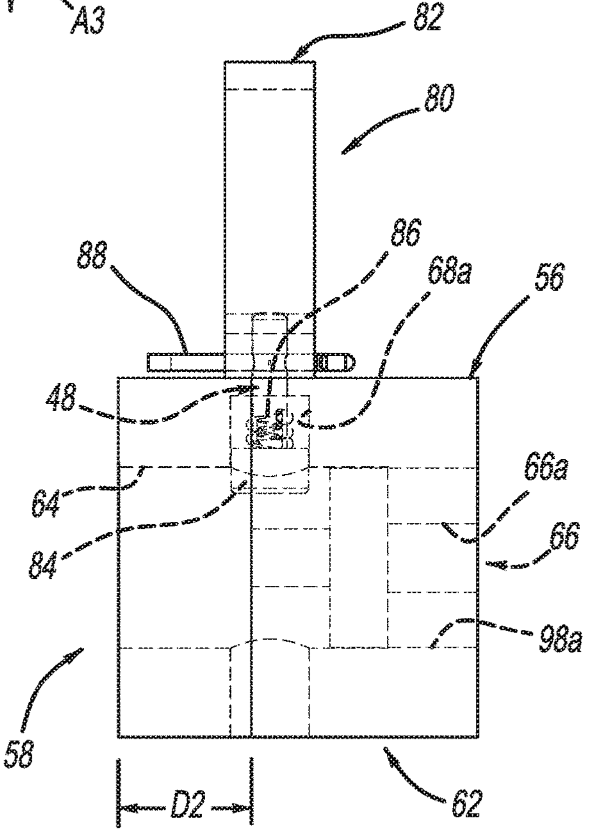
FIG. 7 is a side view of the base of FIG. 6.

With reference back to FIG. 3, the rig assembly 32 includes a first leg assembly 50, a second leg assembly 52 and an arm assembly 54, which are each coupled to a base 56. The base 56 is generally monolithic or one-piece, and in one example, is formed of a suitable structurally sound material. For example, the base 56 may be composed of a high strength polymer, but may also be composed of a metal or metal alloy, such as brass or aluminum. In one example, the base 56 is composed of aluminum. With reference to FIGS. 6 and 7, the base 56 includes a central portion 58, a first branch 60 and a second branch 62. In certain embodiments, the base 56 includes a coating S, such as a paint or other visual indicator on a surface of the base 56 to indicate that the remote access pull rig 10 is positioned in the first, extended position. The central portion 58 extends a distance D2 (FIG. 7) beyond a surface of the first branch 60 and the second branch 62 to enable the rope funnel 38 to be positioned above a plane that contains the first leg assembly 50 and the second leg assembly 52 (FIG. 3). The central portion 58 defines a first bore 64, a second bore 66 and a third bore 68. In certain instances, the central portion 58 may define a first wall 58*a* and a second wall 58*b* adjacent to the first bore 64 to guide the movement of the first leg assembly 50 and the second leg assembly 52 relative to the base 56. For example, the first wall 58*a* and the second wall 58*b* may comprise stops for the movement of the first leg assembly 50 and the second leg assembly 52, respectively.

Generally, the first bore 64 has a diameter that is larger than the second bore 66. The first bore 64 is generally positioned so as to be symmetric with regard to an axis A3 of the base 56 (FIG. 6). The first bore 64 and the second bore 66 may be concentric about an axis that is substantially transverse to the axis A3. The first bore 64 is sized and shaped to receive the coupling end 42 of the rope funnel 38. The second bore 66 is sized and shaped to cooperate with a knob 70 (FIG. 3). The second bore 66 may include a plurality of threads along a threaded portion 66*a* of the second bore 66 to enable the knob 70 to be rotated or tightened against the base 56.

Figure 8:
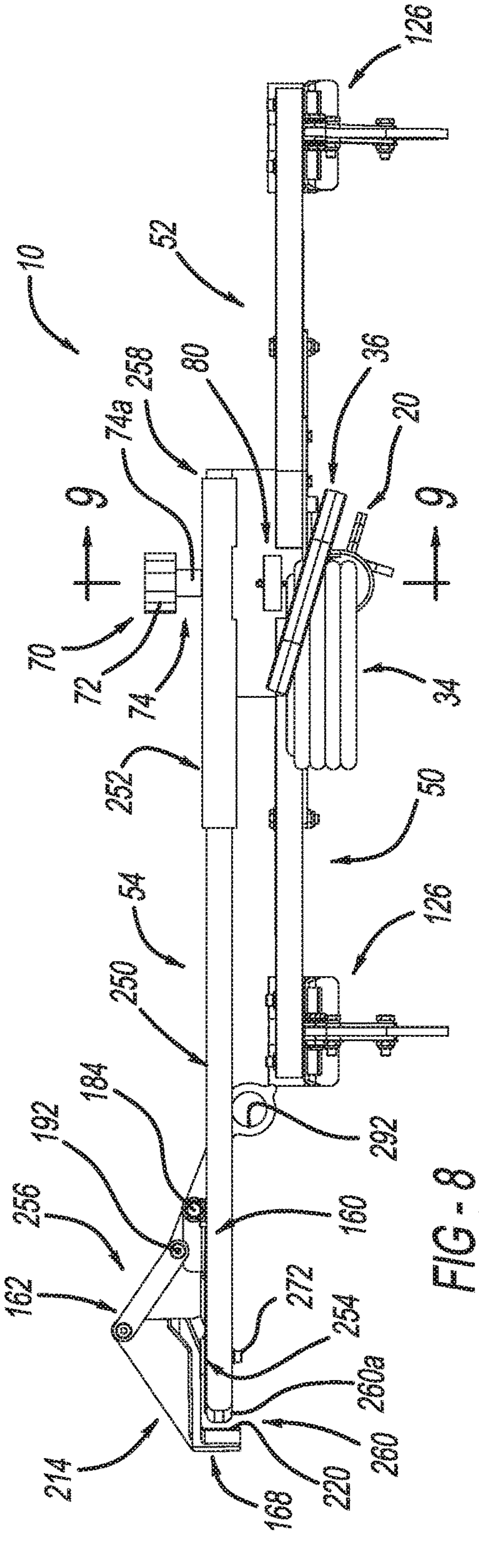
FIG. 8 is a top view of the remote access pull rig of FIG. 1.
Figure 9:
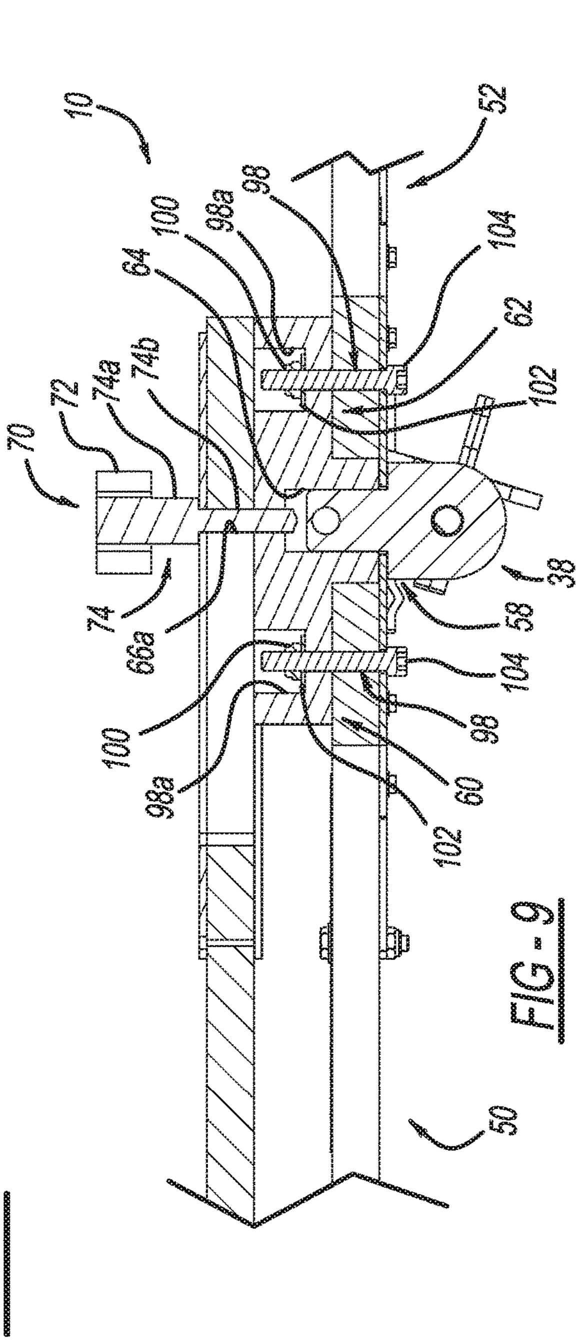
FIG. 9 is a cross-sectional view of the remote access pull rig of FIG. 8, taken along line 9-9 of FIG. 8.

For example, with reference to FIGS. 8 and 9, the knob 70 is shown tightened to the second bore 66. In this example, the knob 70 includes a graspable portion 72 and a shaft 74. The graspable portion 72 may be composed of a suitable metal or metal alloy, such as aluminum, while the shaft 74 may be composed of a metal or metal alloy, such as steel. Alternatively, the graspable portion 72 may be composed of a polymer. The graspable portion 72 is coupled to the shaft 74, via any suitable technique, such as stamping, welding, adhesives, mechanical fasteners, etc. The shaft 74 may include an unthreaded portion 74*a* and a threaded portion 74*b*. The unthreaded portion 74*a* enables the shaft 74 to be positioned or tightened against a portion of the arm assembly 54. The threaded portion 74*b* threadably engages the threaded portion 66*a* of the second bore 66 to enable the knob 70 to be rotated relative to the base 56 to tighten or untighten the unthreaded portion 74*a* against a portion of the arm assembly 54. Although not illustrated herein, the second bore 66 may also include a metal sleeve insert, which includes the threaded portion 66*a* to facilitate the engagement between the threaded portion 74*b* of the shaft 74 and the base 56.

With reference to FIGS. 6 and 7, the third bore 68 is defined along the axis A3, and in one example, the third bore 68 includes a counterbore 68*a* that is in communication with the first bore 64. The communication between the counterbore 68*a* of the third bore 68 and the first bore 64 enables the rope funnel 38 to be removably coupled to the base 56. In this example, the third bore 68 is sized and shaped to receive a latch 80. The latch 80 includes a pull ring 82, a latch pin 84, a biasing member or spring 86 and a pin 88.

Figure 10:
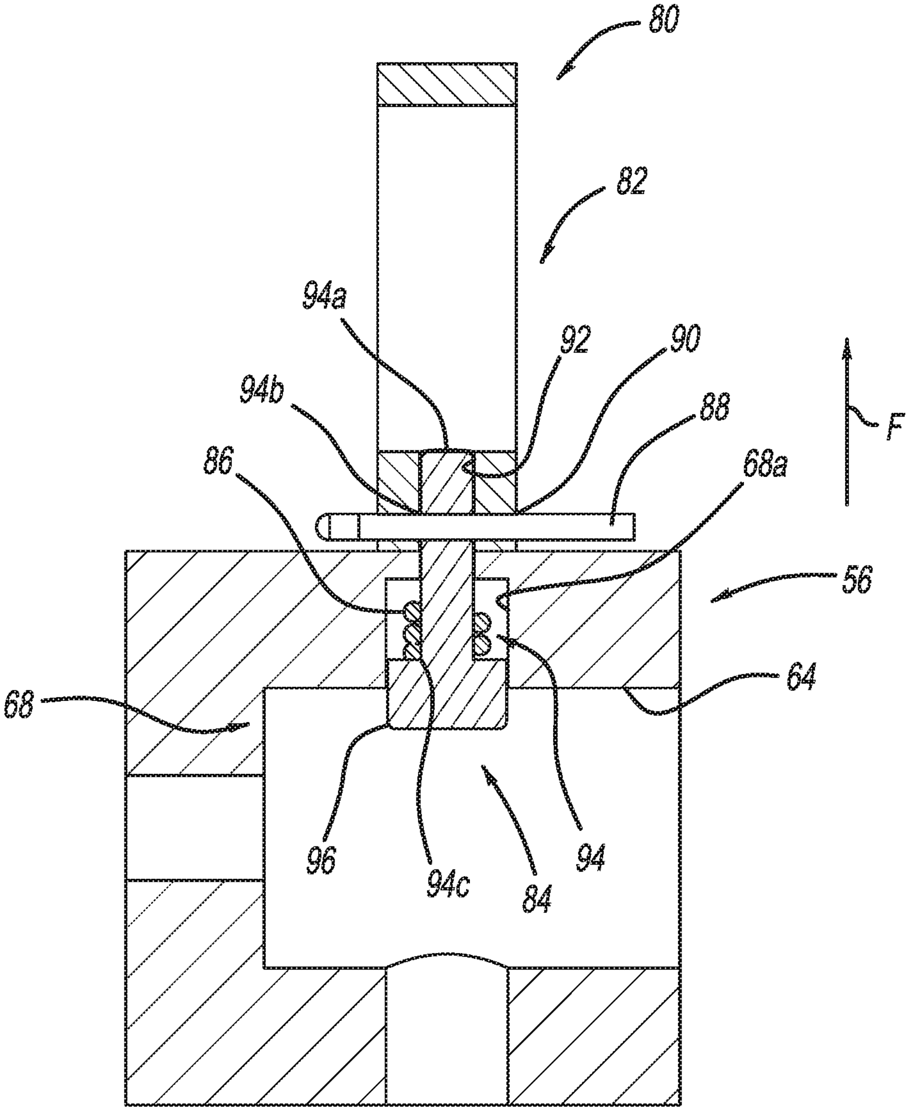
FIG. 10 is a cross-sectional view of a portion of the base of FIG. 6, taken along line 10-10 of FIG. 6.

The pull ring 82 is substantially circular and forms or defines an opening 82*a*. The opening 82*a* enables an operator to apply a force to the latch pin 84 via the pull ring 82. With reference to FIG. 10, the pull ring 82 also includes a first bore 90 and a second bore 92. The first bore 90 extends transverse to the axis A3 and is in communication with the second bore 92. The first bore 90 receives the pin 88 to couple the latch pin 84 to the pull ring 82. The second bore 92 receives a portion of the latch pin 84. Generally, the latch pin 84 is coupled to the pull ring 82 and is movable relative to the base 56 within the third bore 68 via the application of a pulling force to the pull ring 82. The latch pin 84 includes a body 94 and a plug 96. An end 94*a* of the body 94 is received within the pull ring 82. The body 94 defines a bore 94*b* that receives the pin 88 therethrough to couple the latch pin 84 to the pull ring 82. The body 94 is substantially cylindrical and is sized such that the spring 86 is positionable about the body 94.

The plug 96 is formed or defined at an end 94*c* of the body 94. The plug 96 forms a seat for the spring 86, such that the spring 86 is contained within the counterbore 68*a* between a wall of the counterbore 68*a* and the plug 96. The plug 96 is sized to be received within the bore 46 of the coupling end 42 of the rope funnel 38 (FIG. 4). In a first position, as shown in FIG. 10, the plug 96 extends into the first bore 64 to secure the rope funnel 38 to the base 56. In a second position (not shown), upon the application of a force F to the pull ring 82, the plug 96 is retracted against the force of the spring 86 into the first bore 64 to release the rope funnel 38.

The spring 86 biases the plug 96 into the first position. In one example, the spring 86 comprises a coil spring, however, the spring 86 may comprise any suitable biasing member. The pin 88 is received through the first bore 90 to couple the latch pin 84 to the pull ring 82. The pin 88 may comprise any suitable pin or fastener, including, but not limited to a cotter pin, bolt, etc.

With reference back to FIG. 6, the first branch 60 and the second branch 62 each extend outwardly from substantially opposite sides of the central portion 58. In one example, the first branch 60 and the second branch 62 are substantially rectangular, however, the first branch 60 and the second branch 62 may have any desired shape. The first branch 60 and the second branch 62 each define a bore 98. Generally, the bores 98 are positioned so as to be substantially symmetric with respect to the axis A3. With reference to FIG. 9, in one example, the bore 98 includes a counterbore portion 98*a*, which enables the receipt of a mechanical fastener, such as a nut 100 and washer 102. A fastener 104, such as a bolt, may be positioned through the bore 98 to couple a respective one of the first leg assembly 50 and the second leg assembly 52 to the base 56. As is generally known, the fastener 104 (e.g. the bolt) and the nut 100 may include a plurality of threads to enable threaded engagement between the fastener 104 (e.g. bolt) and the nut 100 to secure the respective one of the first leg assembly 50 and the second leg assembly 52 to the base 56.

With reference to FIG. 3, the first leg assembly 50 is coupled to the first branch 60 of the base 56, and the second leg assembly 52 is coupled to the second branch 62. Generally, the first branch 60 and the second branch 62 are at the same height such that when the first leg assembly 50 and the second leg assembly 52 are coupled to the base 56 the first leg assembly 50 and the second leg assembly 52 are in the same plane. The first leg assembly 50 and the second leg assembly 52 are also coupled to each other via a linkage 106. In one example, the linkage 106 includes a first linkage bar 108 movably coupled to a second linkage bar 110. The first linkage bar 108 is coupled to the first leg assembly 50 and the second linkage bar 110 is coupled to the second leg assembly 52. One or more of the first linkage bar 108 and the second linkage bar 110 may include a clasp, to secure the first linkage bar 108 and the second linkage bar 110 in a first, extended position, in which the first leg assembly 50 and the second leg assembly 52 are spaced apart as shown in FIG. 3. The first linkage bar 108 and the second linkage bar 110 are pivotable relative to each other into a second, closed position in which the first linkage bar 108 is pivoted adjacent to the second linkage bar 110 to enable the remote access pull rig 10 to be moved into a second, collapsed position in which the first leg assembly 50 and the second leg assembly 52 are collapsed together or positioned adjacent to each other for transport, for example.

Figure 11:
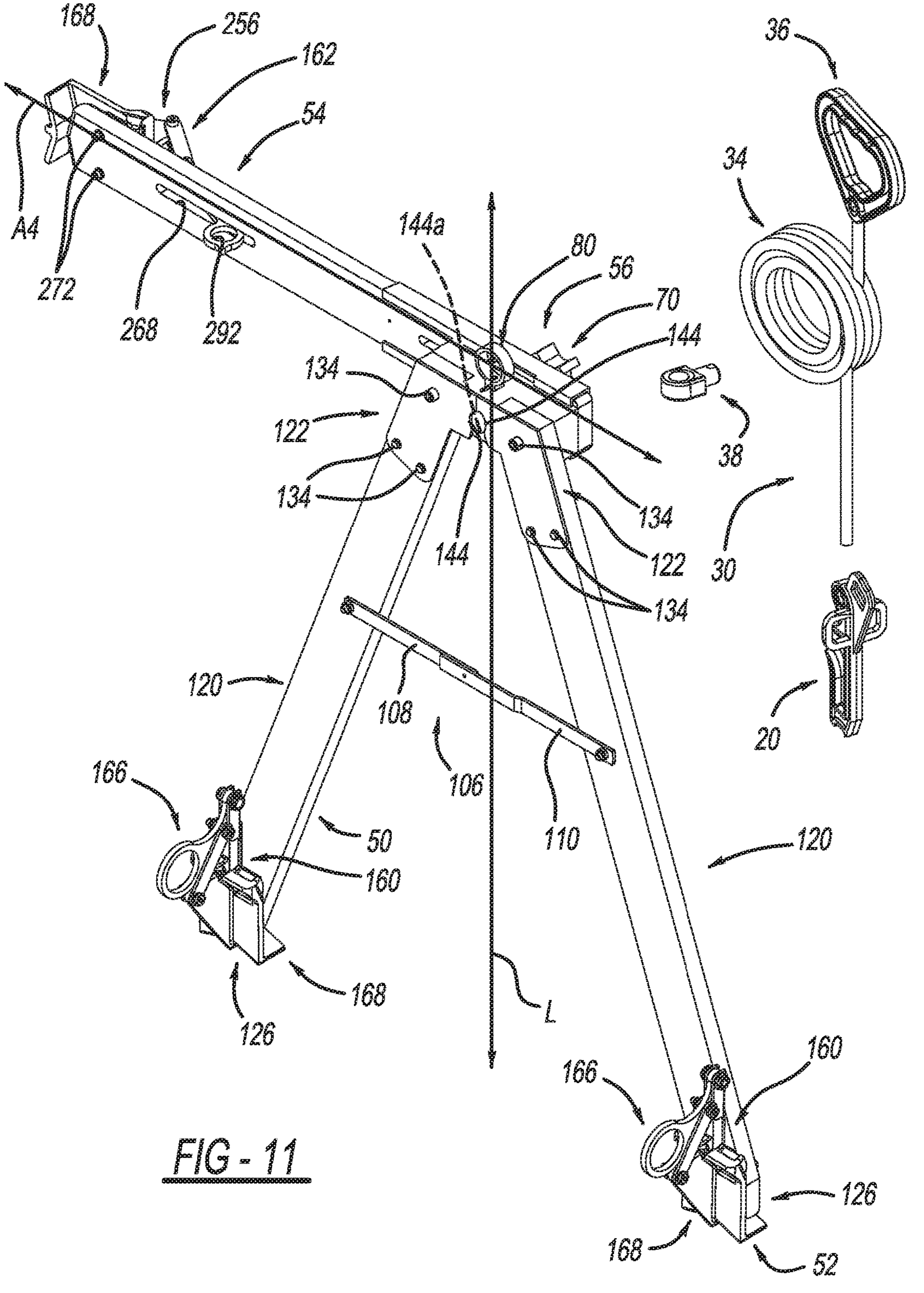
FIG. 11 is a partially exploded perspective view of the remote access pull rig of FIG. 1.

With reference to FIG. 11, as the first leg assembly 50 and the second leg assembly 52 are substantially symmetric with respect to a longitudinal axis L of the remote access pull rig 10, the first leg assembly 50 will be is discussed in detail herein, with the understanding that the second leg assembly 52 is a mirror image of the first leg assembly 50 about the longitudinal axis L. Stated another way, as the first leg assembly 50 is substantially identical to the second leg assembly 52 with the exception of the orientation (i.e. right versus left), the second leg assembly 52 will not be discussed in great detail herein and the same reference numerals will be used to denote the same or similar components. In one example, with additional reference to FIG. 12, the first leg assembly 50 includes a leg 120, a plate 122, a pad 124 and a clamp 126.

The leg 120 is substantially rectangular, and is composed of a suitable electrically insulating material. In one example, the leg 120 is composed of wood, such as red oak, however, the leg 120 may be composed of any suitable material, such as polymer, fiberglass, etc. In the example of the leg 120 being composed of a wood, the leg 120 may also include a weather resistant coating to protect the wood from the elements. The leg 120 includes a first end 128 and a second end 130. The first end 128 includes a plurality of bores 132. The plurality of bores 132 each receive a respective one of a plurality of fasteners 134, such as threaded bolts, to couple the plate 122 to the first end 128. The second end 130 includes a plurality of bores 136, which each receive a respective one of a plurality of fasteners 138 to couple the pad 124 and the clamp 126 to the second end 130. Generally, the second end 130 includes two bores 136; however, the second end 130 may include any number of bores 136. The second end 130 also includes a rounded edge 130*a*. The rounded edge 130*a* enables the second end 130 to be positioned beneath a sill 140 associated with a box 142 of the power distribution system 14 as shown in FIG. 2.

With reference to FIG. 11, the plate 122 is coupled to the first end 128 and is substantially L-shaped. In one example, the plate 122 is composed of a metal or metal alloy; however, the plate 122 may also be composed of a suitable polymer. The plate 122 serves to assist with coupling the rope funnel 38 to the rig assembly 32. In this regard, the plate 122 defines a cut-out 144, which cooperates to define a semi-circular opening 144*a* for receipt of the rope funnel 38 when the first leg assembly 50 is spaced apart from the second leg assembly 52 (i.e. the linkage 106 is in the first, extended position as shown in FIG. 11). Thus, the plates 122 cooperate to define a visual indicator for coupling the rope funnel 38 to the rig assembly 32. The plate 122 may also serve as a reinforcement for the first end 128.

Figure 13:
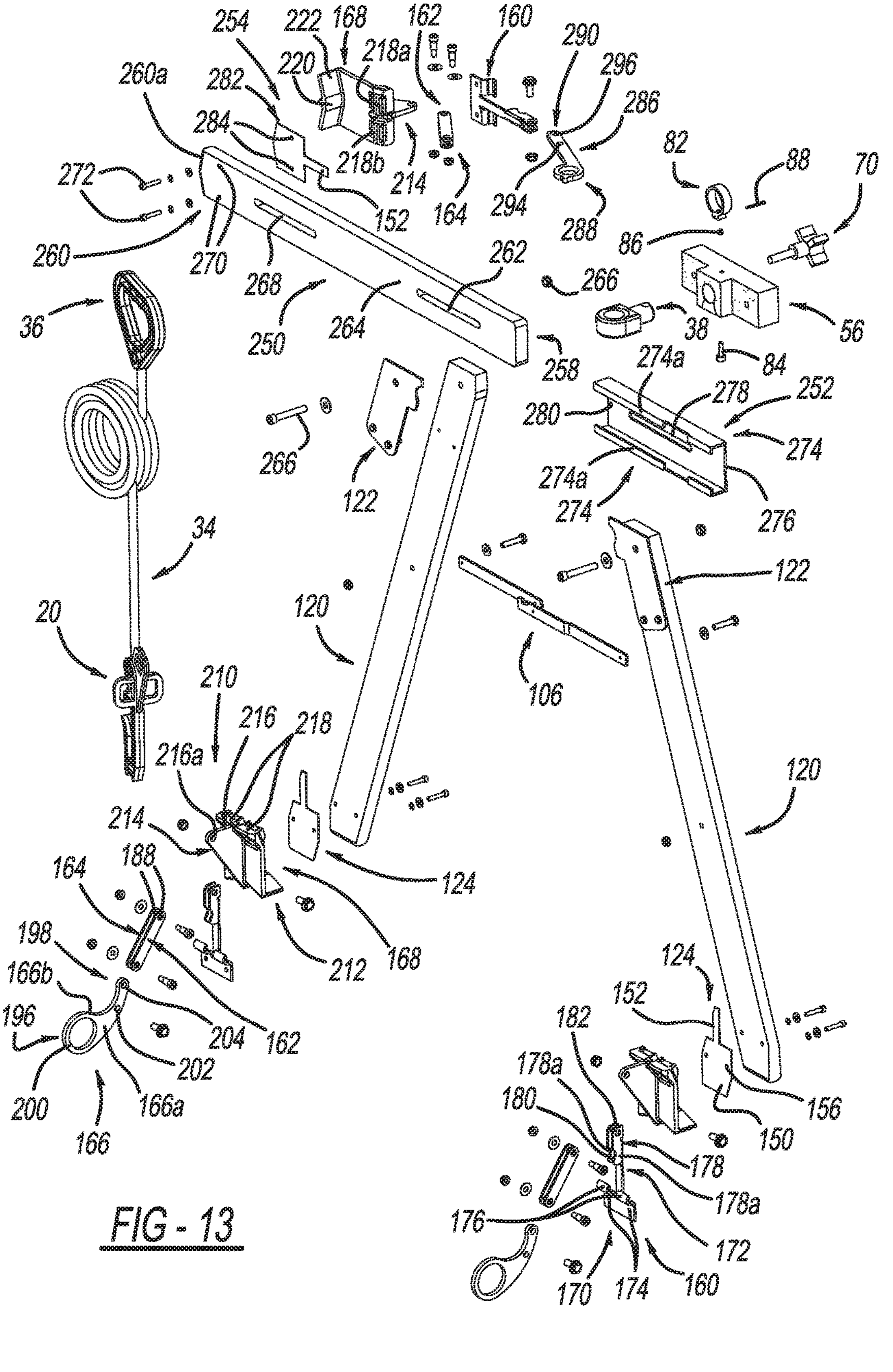
FIG. 13 is an exploded view of the remote access pull rig of FIG. 1.

The pad 124 is coupled to the second end 130. The pad 124 comprises a grip surface or interface between the second end 130 and the sill 140 (FIG. 2). In one example, the pad 124 comprises a rubber pad, however, the pad 124 may be composed of any suitable material. Moreover, the second end 130 need not include the pad 124, if desired. As best shown in FIG. 13, the pad 124 has a base 150 and a tail 152. The base 150 defines a plurality of apertures 154, which correspond to the plurality of bores 136 of the second end 130. Generally, the plurality of fasteners 138 are received through the plurality of apertures 154 to couple the pad 124 to the second end 130. It should be noted that in certain embodiments the pad 124 is also coupled to the second end 130 via an adhesive, which is applied to a surface of the pad 124 adjacent to the second end 130 of the leg 120. The base 150 covers substantially an entirety of the second end 130 near the rounded edge 130*a* to provide a grip surface for contacting the sill 140 (FIG. 2). The tail 152 extends out from the base 150 to provide a contact surface for a portion of the clamp 126. In certain instances, the tail 152 protects the portion of the clamp 126 from contacting the leg 120.

Figure 12:
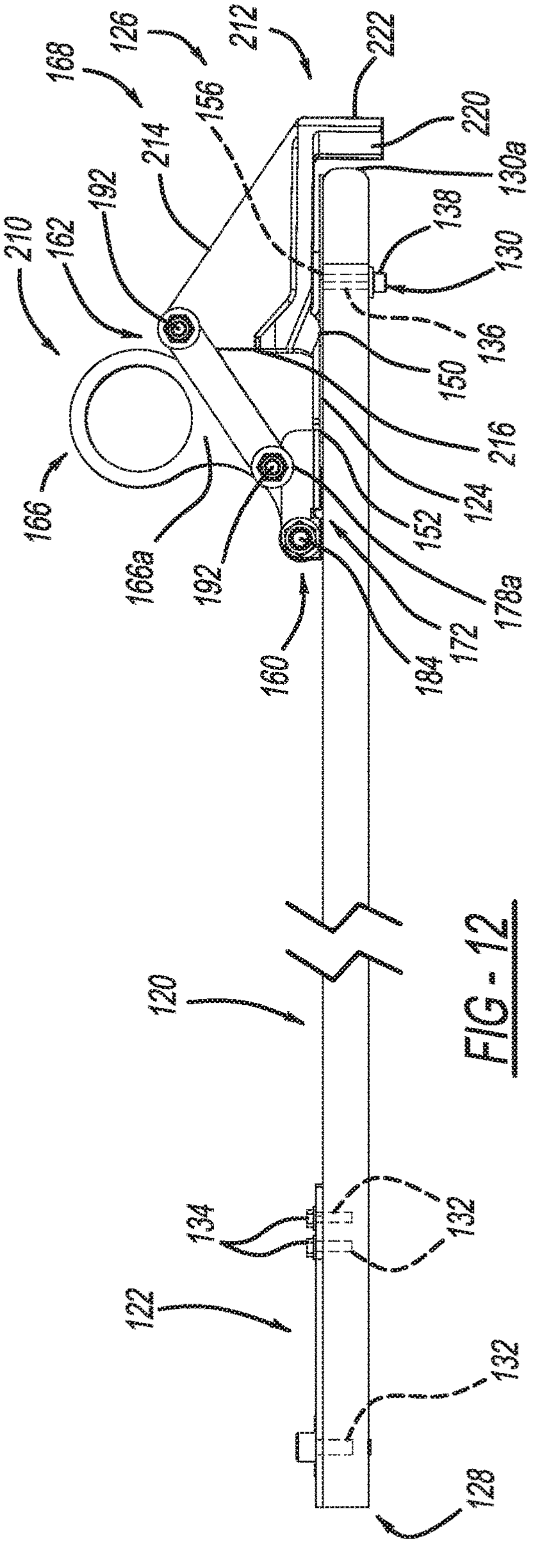
FIG. 12 is a side view of a leg assembly associated with the remote access pull rig of FIG. 1.

With reference to FIG. 12, the clamp 126 of the first leg assembly 50 is coupled to the second end 130 of the leg 120 via the plurality of fasteners 138. The clamp 126 is coupled to the second end 130 such that the pad 124 is positioned between the clamp 126 and a surface of the leg 120 at the second end 130. In one example, with reference to FIG. 13, the clamp 126 includes a hinge plate 160, a first link 162, a second link 164, a handle 166 and a clamp foot 168.

The hinge plate 160 is coupled to the second end 130 on top of the pad 124. The hinge plate 160 may be composed of a metal or a metal alloy, however, the hinge plate 160 may be composed of any suitable material. In one example, the hinge plate 160 includes a hinge base 170 and a linkage arm 172. The hinge base 170 includes a plurality of apertures 174, which correspond to the plurality of apertures 154 such that the plurality of fasteners 138 may be received the plurality of apertures 174 to couple the hinge base 170 to the second end 130. The hinge base 170 also includes two pivot points 176. The two pivot points 176 are each substantially semi-circular, and in one example, are substantially C-shaped. The two pivot points 176 cooperate with a portion of the clamp foot 168 to enable the clamp foot 168 to pivot relative to the second end 130.

The linkage arm 172 extends outwardly from the hinge base 170 towards the first end 128 of the leg 120 when the clamp 126 is coupled to the leg 120. In one example, the linkage arm 172 defines a substantially U-shaped channel. The linkage arm 172 has a pair of walls 178 separated by a channel 180. The walls 178 each include a relief 178*a*. The relief 178*a* is arcuate, and provides clearance for the movement of the first link 162 and the second link 164. Each of the walls 178 define a bore 182. Each of the bores 182 cooperate to receive a fastener 184, such as a bolt, therethrough to couple the handle 166 to the hinge plate 160. A nut 186 and a washer 187 may be used to secure the fastener 184 to the bores 182, however, it should be understood that any suitable fastening technique may be used to couple the handle 166 to the hinge plate 160. The channel 180 provides clearance for the handle 166 when the clamp 126 is in a first, clamped position (FIG. 12). The clamp 126 is shown in a second, unclamped position in FIG. 14.

Figure 14:
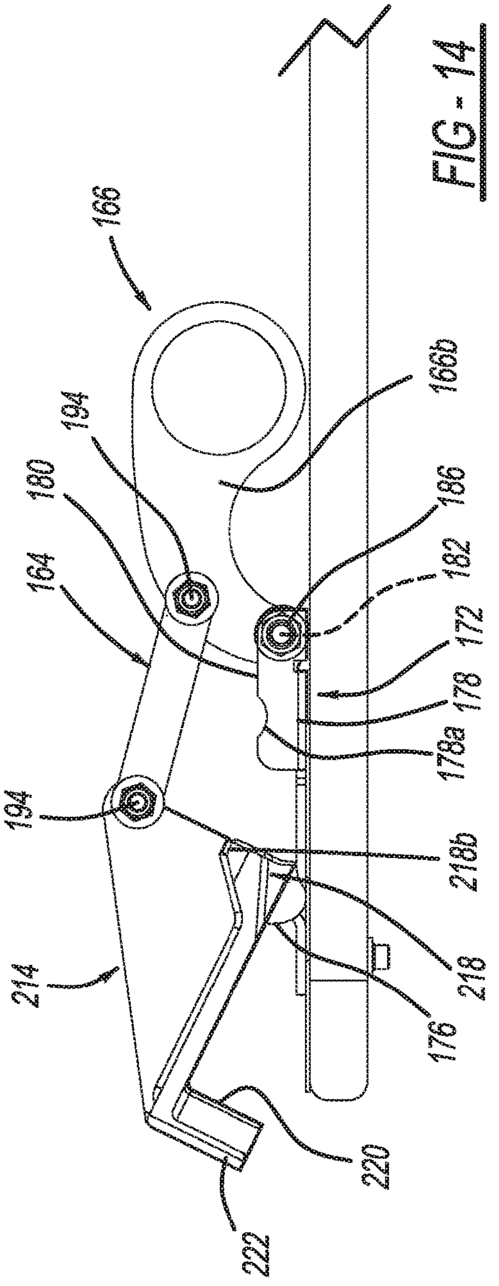
FIG. 14 is a detail view of a clamp associated with the leg assembly of FIG. 12, in a second, unclamped position.

The first link 162 and the second link 164 cooperate to move or pivot the clamp foot 168 relative to the link plate 160 between the first, clamped position (FIG. 12) and the second, unclamped position (FIG. 14). Thus, the first link 162 and the second link 164 pivotally couple the clamp foot 168 to the link plate 160. In this example, the first link 162 is coupled to a first side 166*a* of the handle 166, and the second link 164 is coupled to a second side 166*b* of the handle 166. Generally, the first link 162 and the second link 164 are substantially identical, and are each generally planar. The first link 162 and the second link 164 are composed of a metal or metal alloy, but may be composed of a suitable polymer. In addition, it should be noted that the use of the first link 162 and the second link 164 is merely exemplary, as the clamp 126 may include a single link. The use of the first link 162 and the second link 164 assists in force distribution during the clamping of the clamp foot 168 to the sill 140 (FIG. 2). The first link 162 and the second link 164 each include a first bore 188 and a second bore 190. The first bores 188 cooperate to receive a fastener 192, such as a bolt, therethrough to couple the first link 162 and the second link 164 to the handle 166. A nut 194 and a washer 195 may threadably engage threads formed on the fastener 192 to securely couple the first link 162 and the second link 164 to the handle 166. Similarly, the second bores 190 cooperate to receive a fastener, such as the fastener 192, therethrough to couple the first link 162 and the second link 164 to the clamp foot 168. The nut 194 and the washer 195 may threadably engage threads formed on the fastener 192 to securely couple the first link 162 and the second link 164 to the clamp foot 168.

The handle 166 is coupled to the hinge plate 160 via the fastener 184 and is coupled to the first link 162 and the second link 164 via the fastener 192. The handle 166 is composed of a metal or metal alloy, but may also be composed of a suitable polymer. The handle 166 includes a first end 196 and a second end 198. The first end 196 defines a first bore 200, which is sized to enable the handle 166 to be manipulated by an operator. The second end 198 includes a second bore 202 and a third bore 204. The second bore 202 and the third bore 204 each have a diameter, which is smaller than a diameter of the first bore 200. The second bore 202 receives the fastener 192 to couple the first link 162 and the second link 164 to the handle 166, and the third bore 204 receives the fastener 184 to couple the handle 166 to the hinge plate 160.

The clamp foot 168 is sized and shaped to clamp onto the sill 140 (FIG. 2). The clamp foot 168 is generally composed of an electrically insulating material, such as a polymer. The clamp foot 168 has a first, coupling end 210 and a second, clamping end 212. A triangular projection 214 may extend from the coupling end 210 to the clamping end 212. The triangular projection 214 provides for force transfer between the first link 162 and the second link 164 and the clamping end 212. A base 216 of the triangular projection 214 may be at the coupling end 210, and may define a bore 216*a* for receipt of the fastener 192 to couple the first link 162 and the second link 164 to the clamp foot 168. The coupling end 210 may also include a pair of pivot anchors 218. Each of the pivot anchors 218 cooperate with a respective one of the pivot points 176 to movably or pivotally couple the clamp foot 168 to the hinge plate 160. In one example, the pivot anchors 218 define rails 218*a* that are received in slots 218*b* to receive a respective one of the pivot points 176.

The clamping end 212 clamps onto the sill 140 (FIG. 2) in the second, clamped position. In one example, with reference to FIGS. 12 and 14, the clamping end 212 is substantially L-shaped, and includes an indentation 220. The indentation 220 is formed to generally extend from a tip of the triangular projection 214. The indentation 220 provides a line of clamp force or a line of contact between the clamping end 212 and the sill 140. Thus, the indentation 220 serves to provide a greater clamp force onto the sill 140 by concentrating the force into a line of contact as compared to surface to surface contact. In addition, the indentation 220 also helps orientate the clamping end 212 over the sill 140. The clamping end 212 also includes two surfaces 222, which flare outwardly or extend at an angle outward from the indentation 220. It should be noted that the shape of the clamping end 212 is merely an example, as the clamping end 212 may include multiple indentations or may include no indentations, depending upon the particular power distribution system 14 (FIG. 2).

With reference to FIG. 11, the arm assembly 54 extends outwardly from the base 56, along an axis A4, which is substantially transverse to the longitudinal axis L. In one example, the axis A4 is substantially perpendicular to the longitudinal axis L. The arm assembly 54 couples to a sill 224 of a door 226 of the power distribution system 14, as shown in FIG. 2. With reference to FIG. 8, the arm assembly 54 includes an arm 250, a guide 252, a pad 254 and a clamp 256.

The arm 250 is substantially rectangular, and is composed of a suitable electrically insulating material. In one example, the arm 250 is composed of wood, such as red oak, however, the arm 250 may be composed of any suitable material, such as polymer, fiberglass, etc. In the example of the arm 250 being composed of a wood, the arm 250 may also include a weather resistant coating to protect the wood from the elements. With reference to FIG. 13, the arm 250 includes a first arm end 258 and a second arm end 260. The first arm end 258 includes a slot 262 and a bore 264. The slot 262 is defined along a length of the arm 250 in a longitudinal direction and generally extends along the axis A4. The slot 262 cooperates with the knob 70 and the guide 252 to enable the length of the arm 250 to be adjustable relative to the base 56. Stated another way, the arm 250 is adjustably coupled to the base 56 via the knob 70 such that a position of the arm 250 is adjustable along the axis A4 (i.e. adjustable side-to-side). The adjustability of the arm 250 enables the rig assembly 32 to fit various different configurations of power distribution systems 14. Moreover, the knob 70 cooperates with the base 56 to enable the arm 250 to be coupled to the base 56 in either a right-handed configuration (as shown in FIG. 11) or in a left-handed configuration (i.e. rotated 180 degrees about the axis A4) for use with a power distribution system 14 that has a left side hinged door (instead of a right side hinged door 246 as shown in the drawings). The knob 70 also cooperates with the base 56 to enable the arm 250 to be positioned and secured to the base 56 substantially parallel with the longitudinal axis L when the remote access pull rig 10 is in the second, collapsed position for transport.

The bore 264 receives a fastener 266, such as a bolt, to couple the guide 252 to the arm 250. The second arm end 260 includes a slot 268 and a plurality of bores 270. The slot 268 is defined through the arm 250 in a longitudinal direction and generally extends along the axis A4. The slot 268 enables a portion of the clamp 256 to pass therethrough. The plurality of bores 270 each receive a respective one of a plurality of fasteners 272 to couple the pad 254 and the clamp 256 to the second arm end 260. Generally, the second arm end 260 includes two bores 270; however, the second arm end 260 may include any number of bores 270. The second arm end 260 also includes a contoured edge 260*a*. The contoured edge 260*a* enables the second arm end 260 to be positioned beneath the sill 224 of the door 226 of the power distribution system 14 as shown in FIG. 2.

With reference to FIGS. 8 and 13, the guide 252 is coupled to the first arm end 258 and is substantially U-shaped. In one example, the guide 252 is composed of a metal or metal alloy; however, the guide 252 may also be composed of a suitable polymer. The guide 252 provides a locking surface for the unthreaded portion 74*a* of the knob 70 to couple or fix the position of the arm 250 relative to the base 56. The guide 252 includes opposing walls 274 and a guide base 276. The walls 274 extend outwardly from the guide base 276 and include a flange 274*a*. Each of the flanges 274*a* curve inwardly toward the arm 250 to assist in assembling the guide 252 to the arm 250. The guide base 276 includes a guide slot 278 and a bore 280. The guide slot 278 is defined through the guide base 276 in a longitudinal direction, and cooperates with the slot 268 and the knob 70 to enable the adjustment of the arm 250. In one example, the slot 268 and the guide slot 278 have a width that enables the threaded portion 74*b* of the knob 70 to pass through, but prevents the unthreaded portion 74*a* from passing through such that the unthreaded portion 74*a* tightens against a surface of the guide base 276. The bore 280 is defined through the guide base 276 and cooperates with the bore 264 to receive the fastener 266 to couple the guide 252 to the arm 250.

The pad 254 is coupled to the second arm end 260. The pad 254 comprises a grip surface or interface between the second arm end 260 and the sill 224 (FIG. 2). In one example, the pad 254 comprises a rubber pad, however, the pad 254 may be composed of any suitable material. Moreover, the second arm end 260 need not include the pad 254, if desired. The pad 254 has a base 282 and the tail 152. The base 282 defines a plurality of apertures 284, which correspond to the plurality of bores 270 of the second arm end 260. Generally, the plurality of fasteners 272 are received through the plurality of apertures 284 to couple the pad 254 to the second arm end 260. It should be noted that in certain embodiments the pad 254 is also coupled to the second arm end 260 via an adhesive, which is applied to a surface of the pad 254 adjacent to the second arm end 260 of the arm 250. The base 282 covers substantially an entirety of the second arm end 260 near the contoured edge 260*a* to provide a grip surface for contacting the sill 224 (FIG. 2). The tail 152 extends out from the base 282 to provide a contact surface for a portion of the clamp 256.

With reference to FIG. 8, the clamp 256 is coupled to the second arm end 260 of the arm 250 via the plurality of fasteners 272. The clamp 256 is coupled to the second arm end 260 such that the pad 254 is positioned between the clamp 256 and a surface of the arm 250 at the second arm end 260. In one example, with reference to FIG. 13, similar to the clamp 156 of the first leg assembly 50 and the second leg assembly 52, the clamp 256 includes the hinge plate 160, the first link 162, the second link 164, a handle 286 and the clamp foot 168.

Figure 14A:
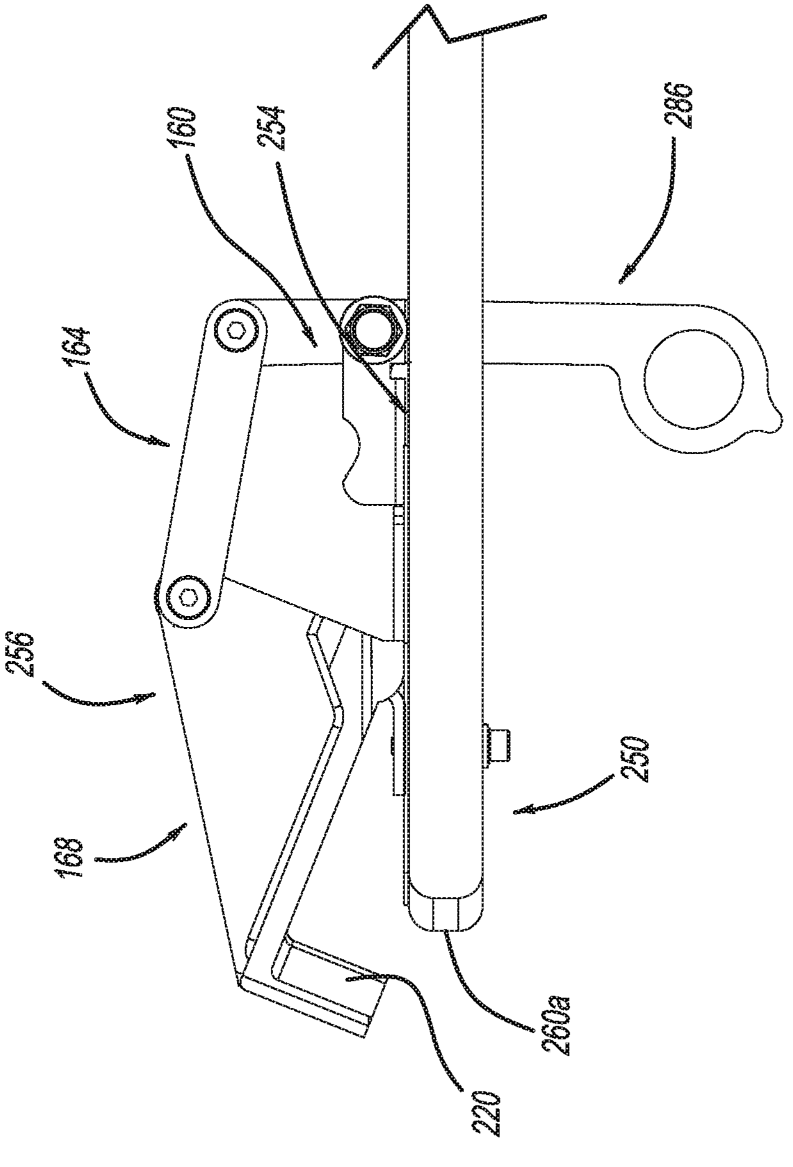
FIG. 14A is a detail view of a clamp associated with the arm assembly of FIG. 11, in a second, unclamped position.

The handle 286 is coupled to the hinge plate 160, and is coupled to the first link 162 and the second link 164. The handle 286 is composed of a metal or metal alloy, but may also be composed of a suitable polymer. The handle 286 includes a first end 288 and a second end 290. The first end 288 defines a first bore 292, which is sized to enable the handle 286 to be manipulated by an operator. Generally, the first end 288 is separated from the second end 290 by a length that enables the first bore 292 to extend through the slot 268 such that the operator may grasp the first bore 292 as it extends through the slot 268, as best shown in FIG. 1. The movement of the handle 286 pivots the clamp foot 168 between a first, clamped position (FIG. 11) and a second, unclamped position (FIG. 14A). With reference back to FIG. 13, the second end 290 includes a second bore 294 and a third bore 296. The second bore 294 and the third bore 296 each have a diameter, which is smaller than a diameter of the first bore 292. The second bore 294 receives the fastener 184 to couple the handle 166 to the hinge plate 160, and the third bore 296 receives the fastener 192 to couple the first link 162 and the second link 164 to the handle 166.

In order to assemble the remote access pull rig 10, initially, the rope assembly 30 may be assembled. In this regard, the first end 34*a* of the rope 34 is tied to the shake-proof hook 20, and with the rope 34 positioned through the rope funnel 38, the second end 34*b* is tied to the handle 36. It should be noted that the handle 36 may be provided preassembled or manufactured (e.g. molded) onto the second end 34*b* of the rope 34, if desired.

With the rope assembly 30 assembled, in one example, the base 56 is assembled with the latch 80 coupled to the base 56. Generally, the latch pin 84 may be inserted through the third bore 68 with the spring 86 coupled about the bore. The pull ring 82 is coupled to the latch pin 84 via the pin 88. The first leg assembly 50 and the second leg assembly 52 of the rig assembly 32 may be assembled. In this regard, the pads 124 may be adhesively coupled to the legs 120, if desired. The hinge plate 160 is coupled to the second end 130 of the legs 120, and the handle 166 is coupled to the hinge plate 160. The first link 162 and the second link 164 are coupled to the handle 166 and the clamp foot 168. The plates 122 are coupled to the first ends 128. The first leg assembly 50 and the second leg assembly 52 are each coupled to a respective one of the first branch 60 and the second branch 62 of the base 56. The linkage 106 is coupled between the legs 120.

The arm assembly 54 is coupled to the base 56. For example, the pad 254 is adhesively coupled to the arm 250, if desired, and the hinge plate 160 is coupled to the arm 250. The handle 286 is coupled to the hinge plate 160, and the first link 162 and the second link 164 are coupled to the handle 166 and the clamp foot 168. The guide 252 is slid onto the first arm end 258, and such that the slot 262 and guide slot 278 align. The knob 70 is received within the slot 262 and guide slot 278, and the knob 70 is rotated to couple the arm assembly 54 to the base 56.

With the rope assembly 30 and the rig assembly 32 assembled, with reference to FIG. 1, with the linkage 106 in the first, extended position, the rig assembly 32 may be coupled to the power distribution system 14. In one example, with the clamps 156 in the second, unclamped position, the rounded edges 160*a* of the legs 120 may be positioned under the sill 140 of the box 142. With the clamp 256 in the second, unclamped position, the contoured edge 260*a* of the arm 250 may be positioned onto the sill 224 of the door 226. The clamps 156, 256 may be moved to the first, clamped position to couple the rig assembly 32 to the box 142 and the door 226. The shake-proof hook 20 is coupled to the fuse 12, and the rope funnel 38 is inserted into the first bore 64 of the base 56 such that the latch 80 couples the rope funnel 38 to the base 56.

With the remote access pull rig 10 assembled and coupled to the box 142, door 226 and the fuse 12, the operator may remotely (i.e. some distance away from the power distribution system 14) pull the fuse 12 from the first, closed position (FIG. 1) to the second, opened position (FIG. 2). In order to pull a second, subsequent fuse 12 associated with the box 142, the operator need not reposition the remote access pull rig 10, but rather, the operator may simply attach the shake-proof hook 20 to the second, subsequent fuse 12. This process may be repeated for all of the fuses 12 associated with the box 142, without requiring a movement or repositioning of the remote access pull rig 10. Thus, the remote access pull rig 10 enables all of the fuses 12 associated with the box 142 to be moved into an open position with a single initial set-up of the remote access pull rig 10. Moreover, the use of the remote access pull rig 10 provides the operator with greater movement about the box 142 as the rope 34 enables flexibility in the orientation of the operator relative to the box 142.

Generally, the first leg assembly 50 and the second leg assembly 52 are in the same plane, and the arm assembly 54 is in a different, offset plane to securely couple the remote access pull rig 10 to the power distribution system 14. The use of three lever arms (two legs 120 and the arm 250) serves to brace the remote access pull rig 10 against the power distribution system 14 while distributing the force against both the box 142 and the door 226. Thus, the remote access pull rig 10 provides an assembly that enables the opening of the fuse 12 remotely, and in a controlled manner.

Figure 15:
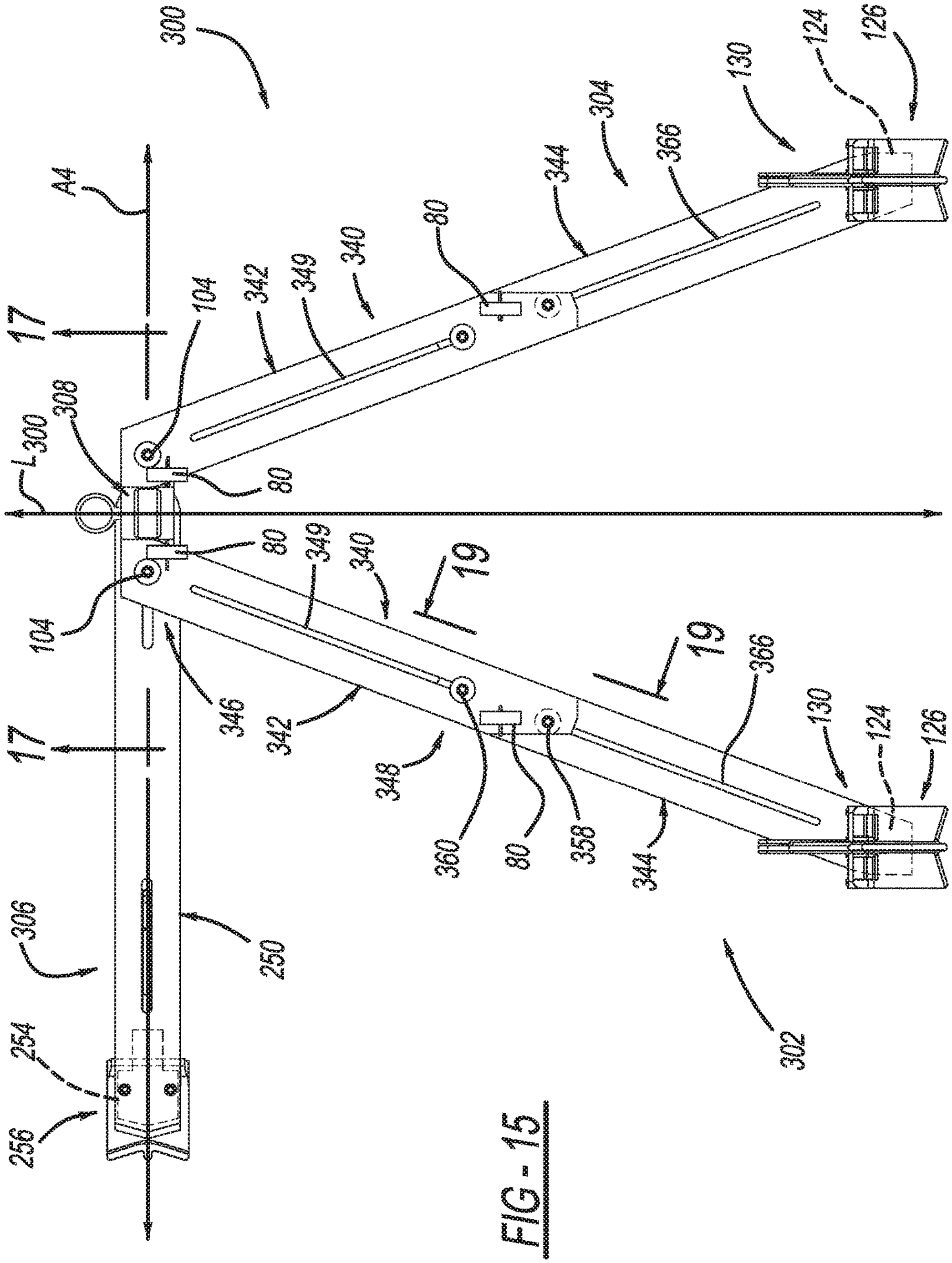
FIG. 15 is a perspective view of a remote access pull rig for use with a fuse of a power distribution system in accordance with the present disclosure, in which the remote access pull rig is in a first, extended position.

With reference now to FIG. 15, a remote access pull rig is shown to include a rig assembly 300. As the rig assembly 300 can be similar to the rig assembly 32 discussed with regard to FIGS. 1-14, only the differences between the rig assembly 300 and the rig assembly 32 will be discussed in detail herein the same reference numerals used to denote the same or substantially similar components. The rig assembly 300 can be employed with the rope assembly 30 and coupled to the box 142 and the door 226 of the power distribution system 14 to provide leverage to move the fuse 12 between the first position and the second position (FIGS. 1 and 2).

Figure 16:
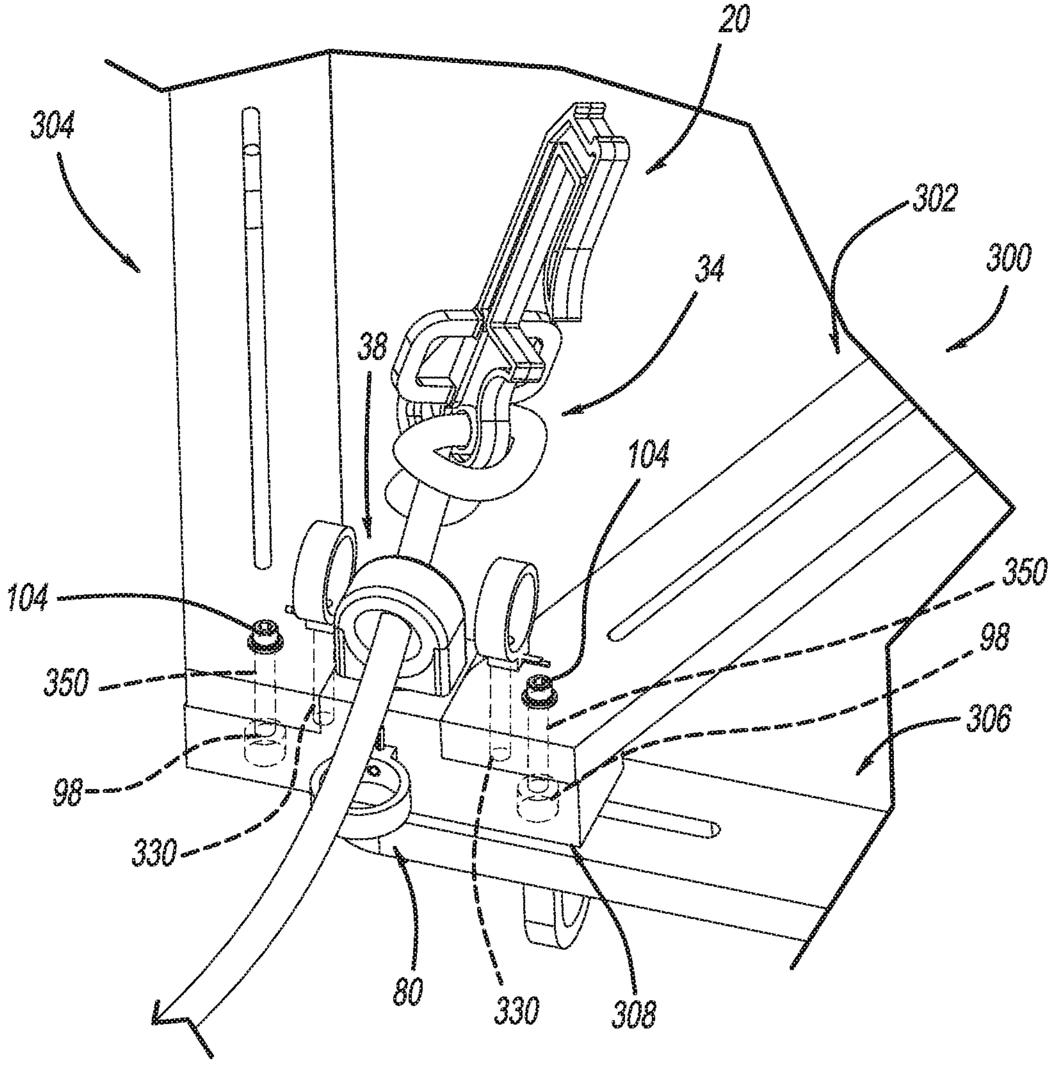
FIG. 16 is a detail view of a portion of the remote access pull rig of FIG. 15.
Figure 17:
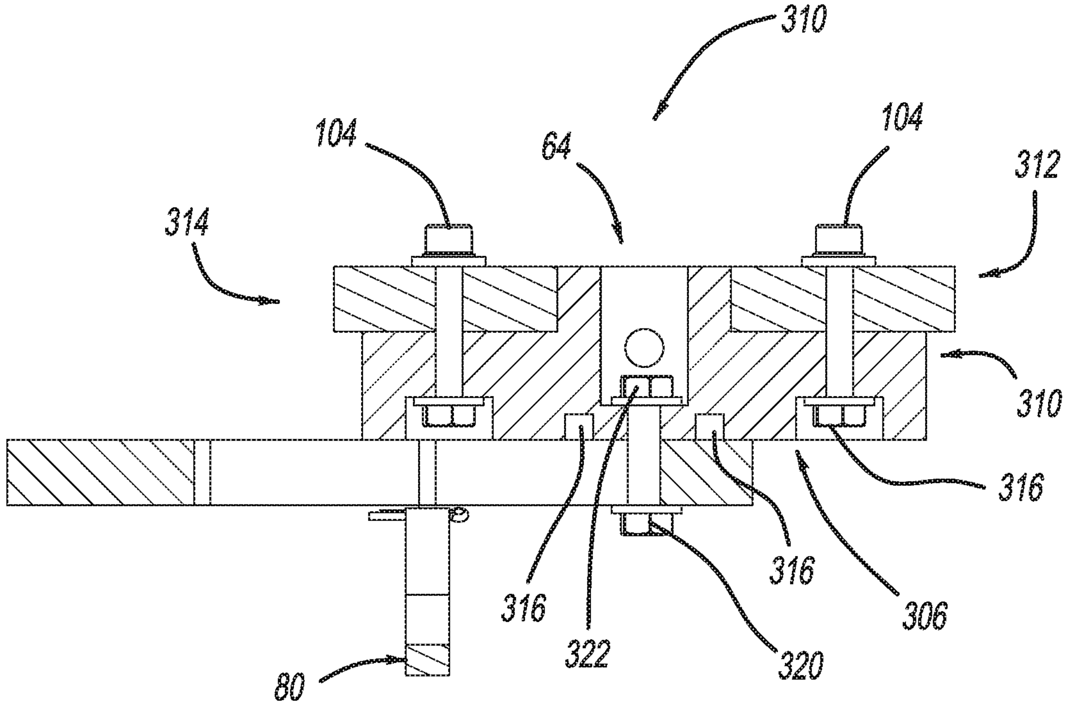
FIG. 17 is a cross-sectional view of a portion of the remote access pull rig of FIG. 15, taken along line 17-17 of FIG. 15.

With reference to FIG. 15, the rig assembly 300 includes a first leg assembly 302, a second leg assembly 304 and an arm assembly 306, which are each coupled to a base 308. The base 308 is generally monolithic or one-piece, and in one example, is formed of a suitable structurally sound material. For example, the base 308 may be composed of a high strength polymer, but may also be composed of a metal or metal alloy, such as brass or aluminum. In one example, the base 308 is composed of aluminum. With reference to FIG. 16, the base 308 includes a central portion 310, a first branch 312 and a second branch 314. With reference to FIG. 17, a plurality of bores 316 may extend along a surface of the base 308 to facilitate the coupling of the arm assembly 306 to the base 308 at various positions. The central portion 310 extends a distance beyond a surface of the first branch 312 and the second branch 314 to enable the rope funnel 38 to be positioned above a plane that contains the first leg assembly 302 and the second leg assembly 304. With reference to FIG. 17, the central portion 310 defines the first bore 64 and a second bore 318. The first bore 64 is sized and shaped to receive the coupling end 42 of the rope funnel 38. The second bore 318 may be in communication with the first bore 64 to enable the receipt of a fastener 320, such as a bolt, to couple the arm assembly 306 to the base 308. In this example, a nut 322 and a washer may be received in a portion of the first bore 64 to assist in coupling the arm assembly 306 to the base 308. In certain embodiments, another latch 80 may be used to position the arm assembly 306 along the base 308 such that a position of the arm assembly 306 is adjustable relative to the base 308 to fit various power distribution systems 14. In this example, the latch pin 84 may engage one of the plurality of bores 316 to secure the arm assembly 306 relative to the base 308.

With reference back to FIG. 16, the first branch 312 and the second branch 314 each extend outwardly from substantially opposite sides of the central portion 310. In one example, the first branch 312 and the second branch 314 are substantially rectangular, however, the first branch 312 and the second branch 314 may have any desired shape. The first branch 312 and the second branch 314 each define the bore 98, and a positioning bore 330. The fastener 104 may be positioned through the bore 98 to couple a respective one of the first leg assembly 302 and the second leg assembly 304 to the base 308. Each positioning bore 330 cooperates with another respective latch 80 to lock the position of the first leg assembly 302 and the second leg assembly 304 relative to the base 308. In the first, latched position (FIG. 15-16), the first leg assembly 302 is spaced apart from the second leg assembly 304, and in a second, unlatched position (FIG. 18), the first leg assembly 302 is movable adjacent to the second leg assembly 304 for transport.

With reference to FIG. 16, the first leg assembly 302 is coupled to the first branch 312 of the base 308, and the second leg assembly 304 is coupled to the second branch 314. Generally, the first branch 312 and the second branch 314 are at the same height such that when the first leg assembly 302 and the second leg assembly 304 are coupled to the base 308 the first leg assembly 302 and the second leg assembly 304 are in the same plane.

With reference to FIG. 15, as the first leg assembly 302 and the second leg assembly 304 are substantially symmetric with respect to a longitudinal axis L300 of the rig assembly 300, the first leg assembly 302 will be is discussed in detail herein, with the understanding that the second leg assembly 304 is a mirror image of the first leg assembly 302 about the longitudinal axis L300. Stated another way, as the first leg assembly 302 is substantially identical to the second leg assembly 304 with the exception of the orientation (i.e. right versus left), the second leg assembly 304 will not be discussed in great detail herein and the same reference numerals will be used to denote the same or similar components. In one example, the first leg assembly 302 includes a leg subassembly 340, the pad 124 and the clamp 126.

The leg subassembly 340 is substantially rectangular, and includes a first leg portion 342 and a second leg portion 344, which are collapsible relative to each other. Each of the first leg portion 342 and the second leg portion 344 are composed of a suitable electrically insulating material. In one example, the first leg portion 342 and the second leg portion 344 are composed of wood, such as red oak, however, the first leg portion 342 and the second leg portion 344 may be composed of any suitable material, such as polymer, fiberglass, etc. In the example of the first leg portion 342 and the second leg portion 344 being composed of a wood, the first leg portion 342 and the second leg portion 344 may each also include a weather resistant coating to protect the wood from the elements.

Figure 19:
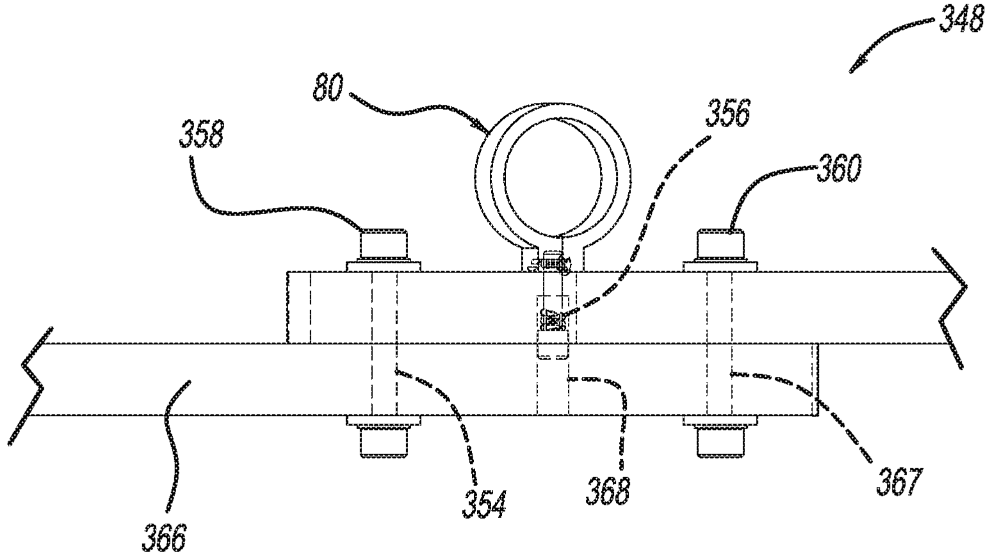
FIG. 19 is a cross-sectional view of a portion of the remote access pull rig of FIG. 15, taken along line 19-19 of FIG. 15.

The first leg portion 342 includes a first end 346, a second end 348 and a slot 349 that extends from the first end 346 to the second end 348. With reference to FIG. 16, the first end 346 includes a bore 350. The bore 350 receives a respective one of the fasteners 104 to couple the first leg portion 342 to the base 308. The first end 346 also includes a positioning bore 352. The positioning bore 352 cooperates with the positioning bore 330 and the latch 80 to fix the position of the leg subassembly 340 relative to the base 308. With reference to FIG. 19, the second end 348 includes a bore 354 and a latch bore 356. The bore 354 receives a fastener 358, such as a bolt, therethrough, to couple the first leg portion 342 and the second leg portion 344 at a desired length. As is generally understood, in the example of the fastener 358 as a bolt, a mating nut and washer may be positioned on the opposite side of the second end 348 to couple the first leg portion 342 and the second leg portion 344 at the desired length.

Figure 18:
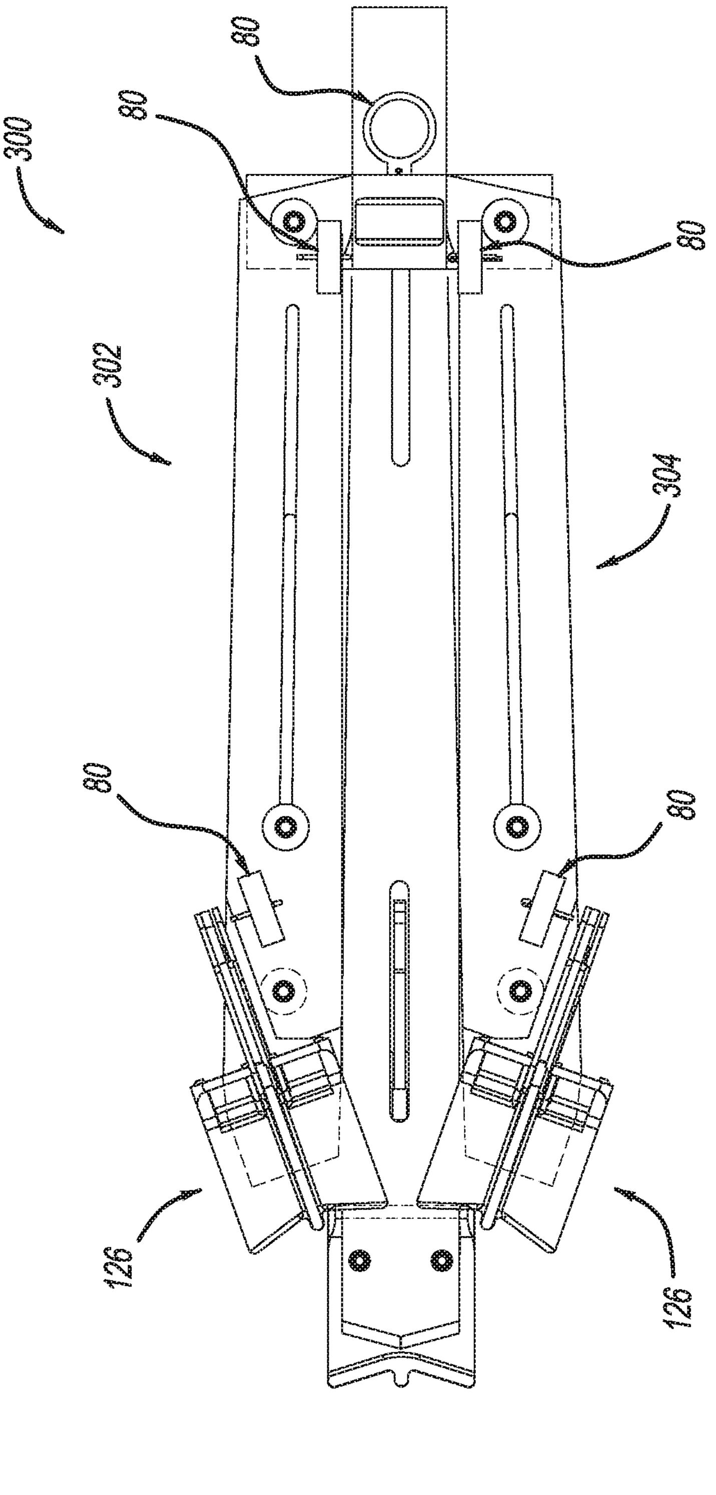
FIG. 18 is a perspective view of the remote access pull rig of FIG. 15, in which the remote access pull rig is in a second, collapsed position.

With reference to FIG. 19, the latch bore 356 cooperates with another latch 80 to enable the latch pin 84 to extend through the first leg portion 243 to lock the second leg portion 344 at an orientation relative to the first leg portion 342. Generally, the latch 80 associated with the first leg portion 342 and the second leg portion 344 locks the first leg portion 342 and the second leg portion 344 in a first, extended orientation (FIG. 15) or a second, collapsed orientation (FIG. 18). The slot 349 receives a suitable fastener 360, such as a bolt, to couple the first leg portion 342 and the second leg portion 344 at the desired length. As is generally understood, in the example of the fastener 360 as a bolt, a mating nut and washer may be positioned on the opposite side of the second end 348 to couple the first leg portion 342 and the second leg portion 344 at the desired length. Thus, the fastener 358 and the fastener 360 cooperate to secure the first leg portion 342 relative to the second leg portion 344 at the desired length.

With reference to FIG. 15, the second leg portion 344 includes a first end 362, the second end 130 and a slot 366 that extends from the first end 362 to near the second end 130. With reference to FIG. 19, the first end 362 includes a bore 367. The bore 367 receives the fastener 360 to couple the first leg portion 342 to the second leg portion 344 at the desired location along the slot 349. The first end 362 also includes a positioning bore 368. The positioning bore 368 cooperates with the latch bore 356 and the latch 80 to fix the orientation of the second leg portion 344 relative to the first leg portion 342. In this regard, the positioning bore 368 receives the latch pin 84, and thus, the positioning bore 368 may not be defined through an entirety of the second leg portion 344, but rather, may comprise a shallow bore. The slot 366 receives the fastener 358, such as a bolt, therethrough, to couple the first leg portion 342 and the second leg portion 344 at a desired length. As is generally understood, in the example of the fastener 358 as a bolt, a mating nut and washer may be positioned on the opposite side of the second end 348 to couple the first leg portion 342 and the second leg portion 344 at the desired length.

With reference to FIG. 15, the arm assembly 306 extends outwardly from the base 308, along the axis A4, which is substantially transverse to the longitudinal axis L. In one example, the axis A4 is substantially perpendicular to the longitudinal axis L. The arm assembly 306 couples to a sill 224 of a door 226 of the power distribution system 14, as shown in FIG. 2. With reference to FIG. 15, the arm assembly 54 includes the arm 250, the pad 254 and the clamp 256.

Figure 20:
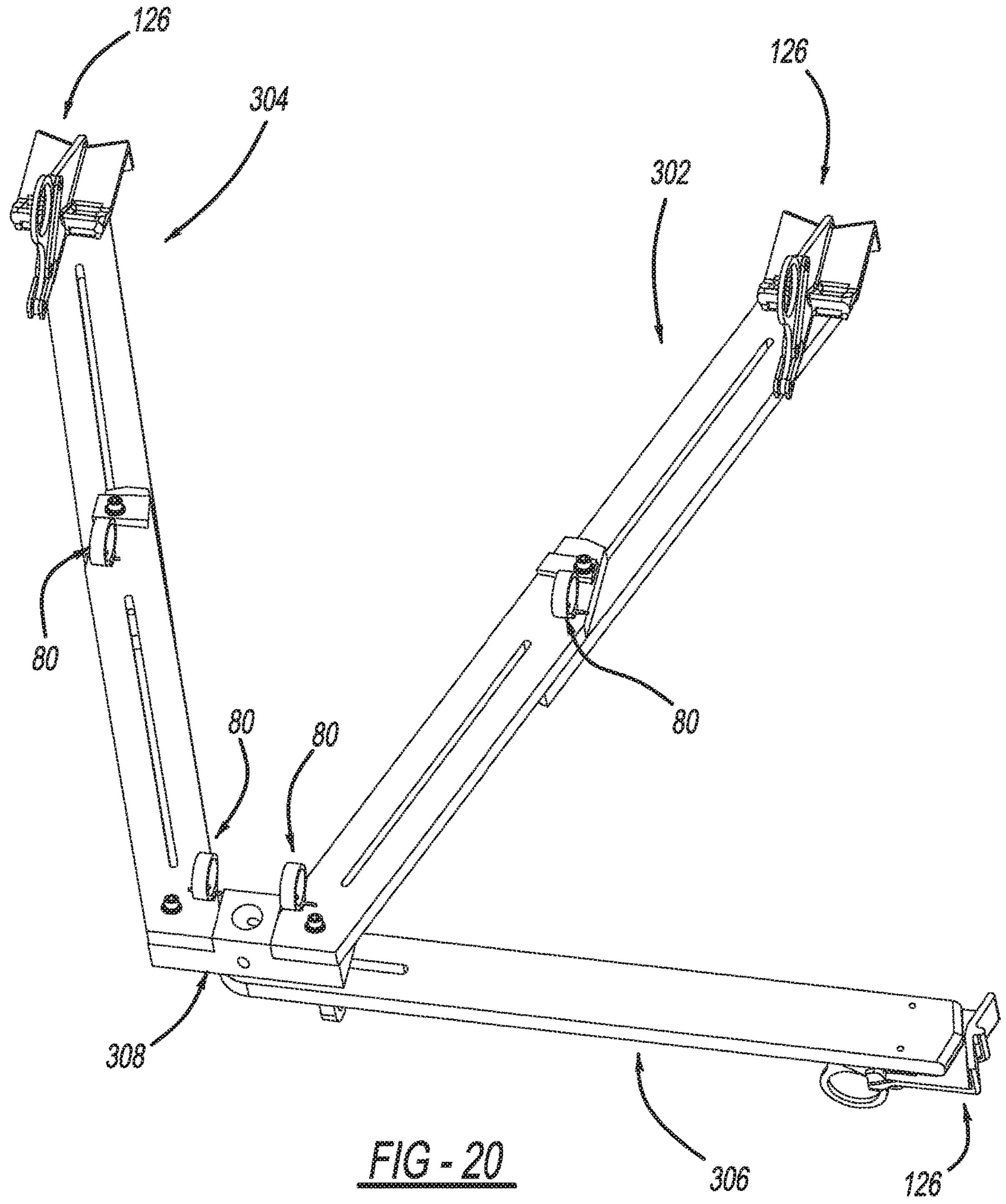
FIG. 20 is a perspective view of the remote access pull rig of FIG. 15, in which another clamp is coupled to an arm assembly of the remote access pull rig.

It should be noted that while the arm assembly 306 is illustrated herein as comprising the clamp 256, it will be understood that the arm assembly 306 may be assembled differently. In this regard, with reference to FIG. 20, the arm assembly 306 may include the clamp 126.

As one of ordinary skill in the art would understand based on the description contained herein how to assemble and use of the rig assembly 300, the assembly and use of the rig assembly 300 will not be discussed in great detail herein. Briefly, however, with the rig assembly 300 in the second, collapsed position (FIG. 18), the first leg portion 342 may be moved into the first, extended orientation (FIG. 15) and secured via the latch 80. The second leg portion 344 may be extended outwardly from the first leg portion 342 and the fasteners 358, 360 tightened to secure the second leg portion 344 at a desired length relative to the first leg portion 342 based on the size of the box 146 associated with the power distribution system 14 (FIG. 1). The arm 250 may be orientated relative to the base and secured via the latch 80 associated with the arm assembly 306 (FIG. 17). The length of the arm 250 may be adjusted based on the position of the door 244 of the power distribution system (FIG. 1).

Figure 21:
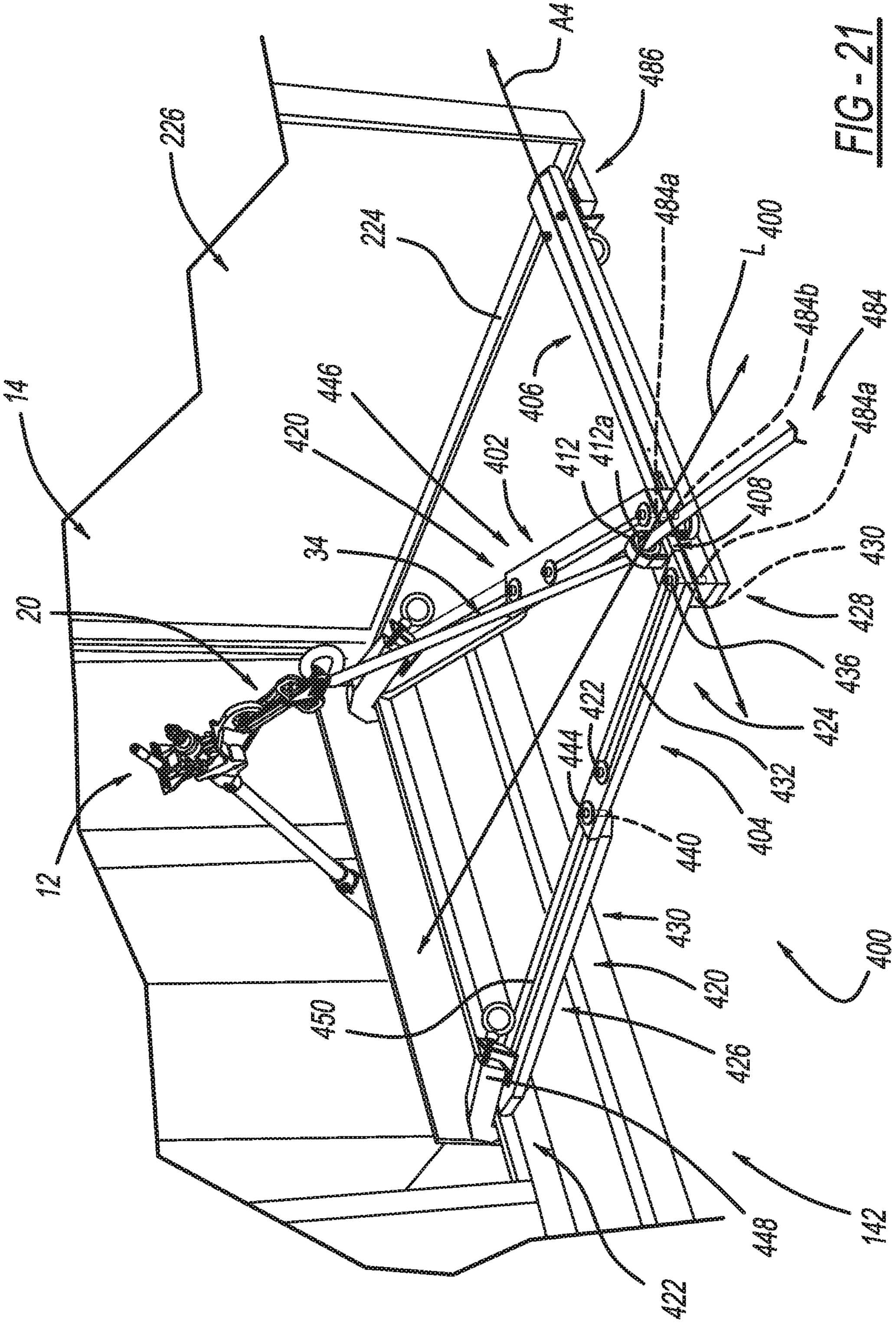
FIG. 21 is a perspective view of a remote access pull rig for use with a fuse of a power distribution system in accordance with the present disclosure, in which the remote access pull rig is in a first, extended position.

With reference now to FIG. 21, a remote access pull rig is shown to include a rig assembly 400. As the rig assembly 400 can be similar to the rig assembly 300 discussed with regard to FIGS. 15-20, only the differences between the rig assembly 400 and the rig assembly 300 will be discussed in detail herein the same reference numerals used to denote the same or substantially similar components. The rig assembly 400 can be employed with the rope 34, handle 36 (not shown) and shake-proof hook 20, and coupled to the box 142 and the door 226 of the power distribution system 14 to provide leverage to move the fuse 12 between the first position and the second position.

The rig assembly 400 includes a first leg assembly 402, a second leg assembly 404 and an arm assembly 406, which are coupled together. A rope funnel 408 is generally coupled between the first leg assembly 402 and the second leg assembly 404 to guide the rope 34 relative to the rig assembly 400. In this example, the rope funnel 408 is composed of a metal or metal alloy, such aluminum, and is substantially rectangular. The rope funnel 408 may define a fastening bore 410 through a surface for receipt of a fastener to couple the rope funnel 408 to the arm assembly 406 between the first leg assembly 402 and the second leg assembly 404. The rope funnel 408 also defines a throughbore 412, which extends through the rope funnel 408 to enable the rope 34 to pass through the rope funnel 408. The throughbore 412 may also include one or more rounded surfaces **412*a* to serve as a guide for the rope 34**.

With continued reference to FIG. 21, the first leg assembly 402 and the second leg assembly 404 are each coupled to the arm assembly 406. Generally, the first leg assembly 402 and the second leg assembly 404 are coupled to the arm assembly 406 such that the first leg assembly 402 and the second leg assembly 404 are in the same plane. In this example, the first leg assembly 402 and the second leg assembly 404 are substantially symmetric with respect to a longitudinal axis L400 of the rig assembly 400, the first leg assembly 402 will be is discussed in detail herein, with the understanding that the second leg assembly 404 is a mirror image of the first leg assembly 402 about the longitudinal axis L400. Stated another way, as the first leg assembly 402 is substantially identical to the second leg assembly 404 with the exception of the orientation (i.e. right versus left), the second leg assembly 404 will not be discussed in great detail herein and the same reference numerals will be used to denote the same or similar components. In one example, the first leg assembly 402 includes a leg subassembly 420 and a clamp 422.

The leg subassembly 420 is substantially rectangular, and includes a first leg portion 424 and a second leg portion 426. Each of the first leg portion 424 and the second leg portion 426 are composed of a suitable electrically insulating material. In one example, the first leg portion 424 and the second leg portion 426 are composed of wood, such as red oak, however, the first leg portion 424 and the second leg portion 426 may be composed of any suitable material, such as polymer, fiberglass, etc. In the example of the first leg portion 424 and the second leg portion 426 being composed of a wood, the first leg portion 424 and the second leg portion 426 may each also include a weather resistant coating to protect the wood from the elements.

The first leg portion 424 includes a first end 428, a second end 430 and a slot 432 that extends from the first end 428 to the second end 430. The first end 428 includes a bore 434. The bore 434 receives a fastener 436, such as a bolt, to couple the first leg portion 424 to the arm assembly 406. As is generally understood, in the example of the fastener 436 as a bolt, a mating nut and washer may be positioned on the opposite side of the arm assembly 406 to couple the first leg portion 424 to the arm assembly 406. The second end 430 includes a first bore 440. The first bore 440 receives a fastener 444, such as a bolt, therethrough, to couple the first leg portion 424 and the second leg portion 426 at a desired length. The slot 432 receives a fastener 444, such as a bolt, to couple the first leg portion 424 to the second leg portion 426 at a desired length. As is generally understood, in the example of the fasteners 442, 444 as bolts, a mating nut and washer may be positioned on the opposite side of the second leg portion 426 to couple the first leg portion 424 to the second leg portion 426.

Figure 21A:
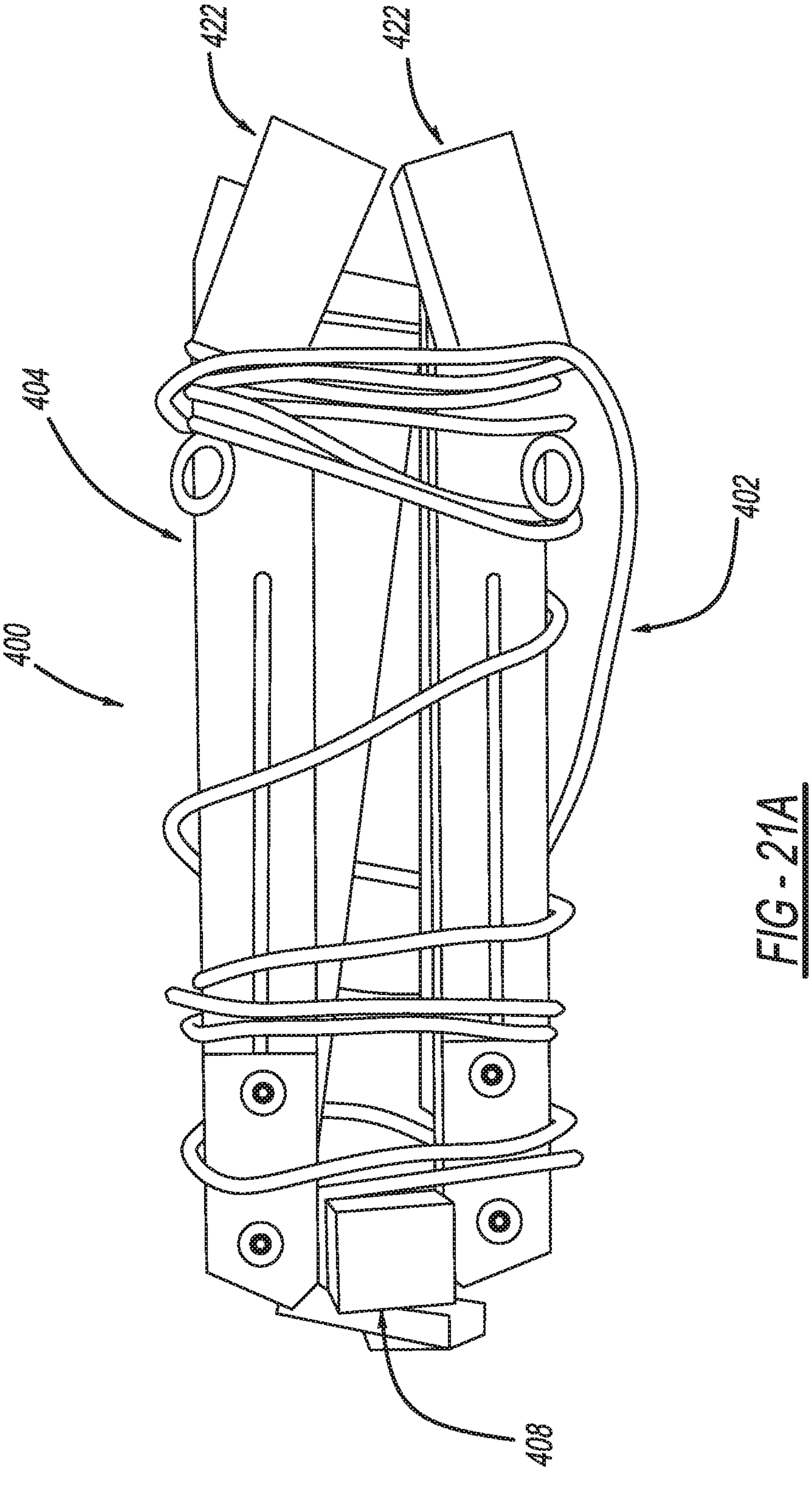
FIG. 21A is a perspective view of the remote access pull rig of FIG. 21, in which the remote access pull rig is in a second, collapsed position.
Figure 22:
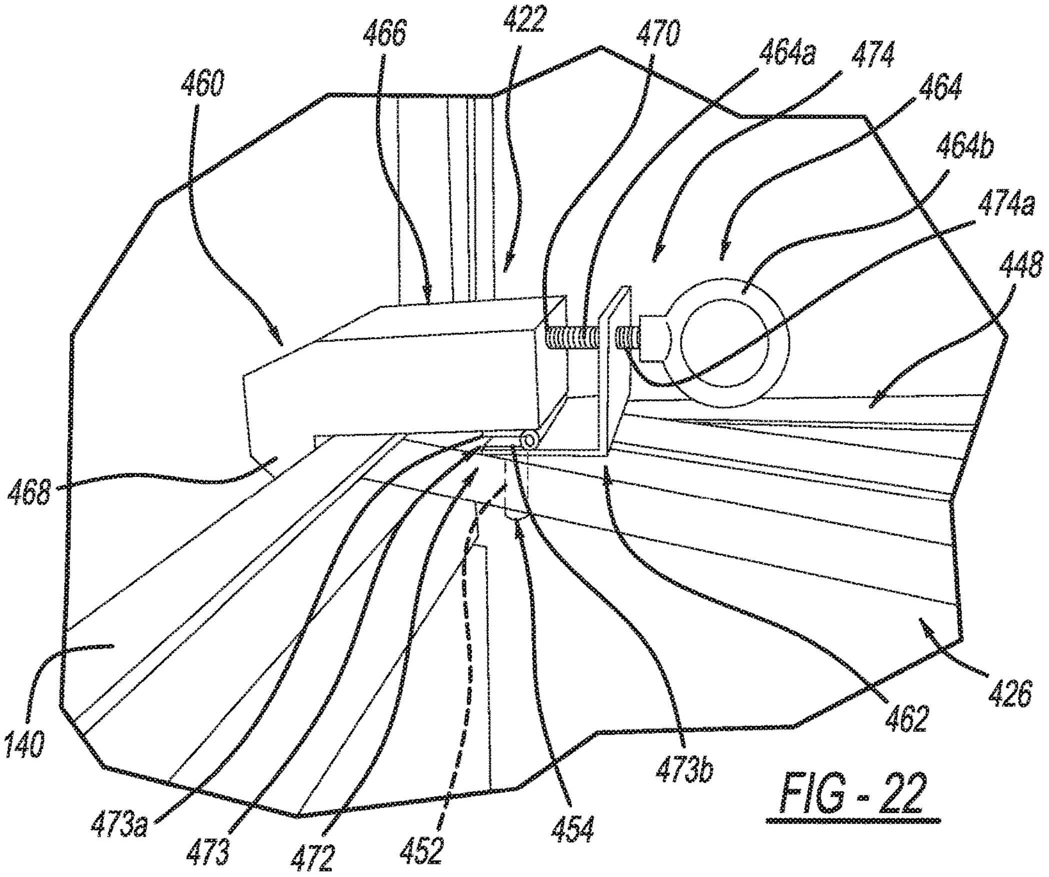
FIG. 22 is a detail view of a clamp associated with a leg assembly of the remote access pull rig of FIG. 21.

The second leg portion 426 includes a first end 446, a second end 448 and a slot 450 that extends from the first end 446 to near the second end 448. The second end 448 includes a clamp bore 452, as best shown in FIG. 22. The clamp bore 452 receives a fastener 454, such as a bolt, therethrough, to couple the clamp 422 to the second leg portion 426. The second end 448 may also include the rounded edge 160*a* to facilitate the engagement of the second end 448 with the sill 140. With reference back to FIG. 21, the slot 450 receives the fastener 444 to couple the first leg portion 424 to the second leg portion 426 at a desired length. Thus, the fasteners 442, 444 cooperate to couple the first leg portion 424 to the second leg portion 426 at a desired length. Moreover, the fasteners 442, 444 enable the first leg portion 424 to collapse relative to the second leg portion 426, as shown in FIG. 21A.

With reference to FIG. 22, the clamp 422 is shown in greater detail. In this example, the clamp 422 includes a clamp foot 460, a flange 462 and a fastener 464. The clamp foot 460 may be composed of an electrically insulating material, such as wood. In one example, the clamp foot 460 may be composed of the same material as the leg assemblies 402, 404. The clamp foot 460 may include base 466 and a lip 468, which extends downwardly from the base 466. The lip 468 extends for a distance below the base 466 to enable the clamp foot 460 to engage with the sill 140. The base 466 may also include a threaded bore 470, which is positioned on the base 466 substantially opposite the lip 468 to receive the fastener 464. In this example, the fastener 464 is a threaded fastener 464*a* with a graspable portion or ring 464*b*; however, any suitable coupling component may be used to adjustably couple the clamp foot 460 to the flange 462. The flange 462 is substantially L-shaped, and may be composed of a metal or metal alloy. A bottom portion 472 of the flange 462 is coupled to the second end 448 of the second leg portion 426. In one example, the bottom portion 472 includes a hinge 473. The base 466 of the clamp foot 460 is coupled to a first portion 473*a* of the hinge 473, and a second portion 473*b* of the hinge 473 includes a bore 475, which receives the fastener 454 to couple the hinge 473 and the flange 462 to the second leg portion 426. The hinge 473 enables pivotal movement of the clamp foot 460 to assist in positioning the clamp foot 460 about the sill 140. The base 466 may be coupled to the first portion 473*a* of the hinge 473 through any suitable technique, including a mechanical fastener, adhesives, etc. A top portion 474 of the flange 462 defines a bore 474*a* that enables the fastener 464 to pass therethrough. The top portion 474 of the flange 462 provides a tightening surface for tightening the clamp foot 460 via the fastener 464 relative to the second leg portion 426.

With reference back to FIG. 21, the arm assembly 406 extends outwardly from the first leg assembly 402 and the second leg assembly 404, along the axis A4, which is substantially transverse to the longitudinal axis L. In one example, the axis A4 is substantially perpendicular to the longitudinal axis L. The arm assembly 406 couples to the sill 224 of the door 226 of the power distribution system 14. The arm assembly 54 includes an arm 480 and the clamp 422.

Figure 23:
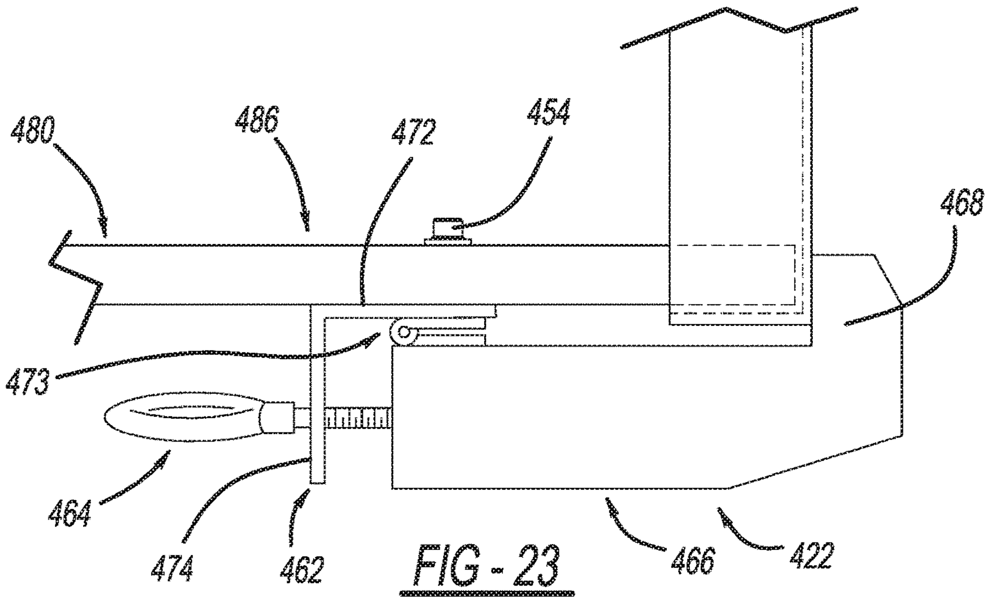
FIG. 23 is a detail view of a clamp associated with an arm assembly of the remote access pull rig of FIG. 21.

The arm 480 is composed of a suitable electrically insulating material. In one example, the arm 480 is composed of wood, such as red oak, however, the arm 480 may be composed of any suitable material, such as polymer, fiberglass, etc. In the example of the arm 480 being composed of a wood, the arm 480 may each also include a weather resistant coating to protect the wood from the elements. The arm 480 includes a first end 484 and a second end 486. The first end 484 defines a plurality of bores 484*a*, 484*b*. Bores 484*a* receive the fasteners 436 to couple the first leg assembly 402 and the second leg assembly 404 to the arm 480. One of the fasteners 436 also enables the arm 480 to be moved into a collapsed position, as shown in FIG. 21A. With reference back to FIG. 21, the bore 484*b* receives a fastener to couple the rope funnel 408 to the arm 480. The second end 486 is coupled to the clamp 422. With reference to FIG. 23, the second end 486 is coupled to the clamp 422 via the fastener 454.

As one of ordinary skill in the art would understand based on the description contained herein how to assemble and use of the rig assembly 400, the assembly and use of the rig assembly 400 will not be discussed in great detail herein. Briefly, however, with the rig assembly 400 in the collapsed position (FIG. 21A), the first leg portion 424 and the second leg portion 426 may be moved and fastened into an extended position, as shown in FIG. 21. The first leg assembly 402 and the second leg assembly 404 may be fastened to the arm 480 via the fasteners 436, and the arm 480 may be orientated relative to the first leg assembly 402 and the second leg assembly 404. With the first leg assembly 402 and the second leg assembly 404 coupled to the arm assembly 406, the rope funnel 408 may also be fastened to the arm 480, and the rope 34 may be inserted through the rope funnel 408. The first end 34*a* of the rope 34 may be tied to the shake-proof hook 20, and the second end may be tied to the handle (not shown). With the shake-proof hook 20 coupled to the fuse 12, the rig assembly 400 may be used to provide leverage to open the fuse 12.

Figure 24A:
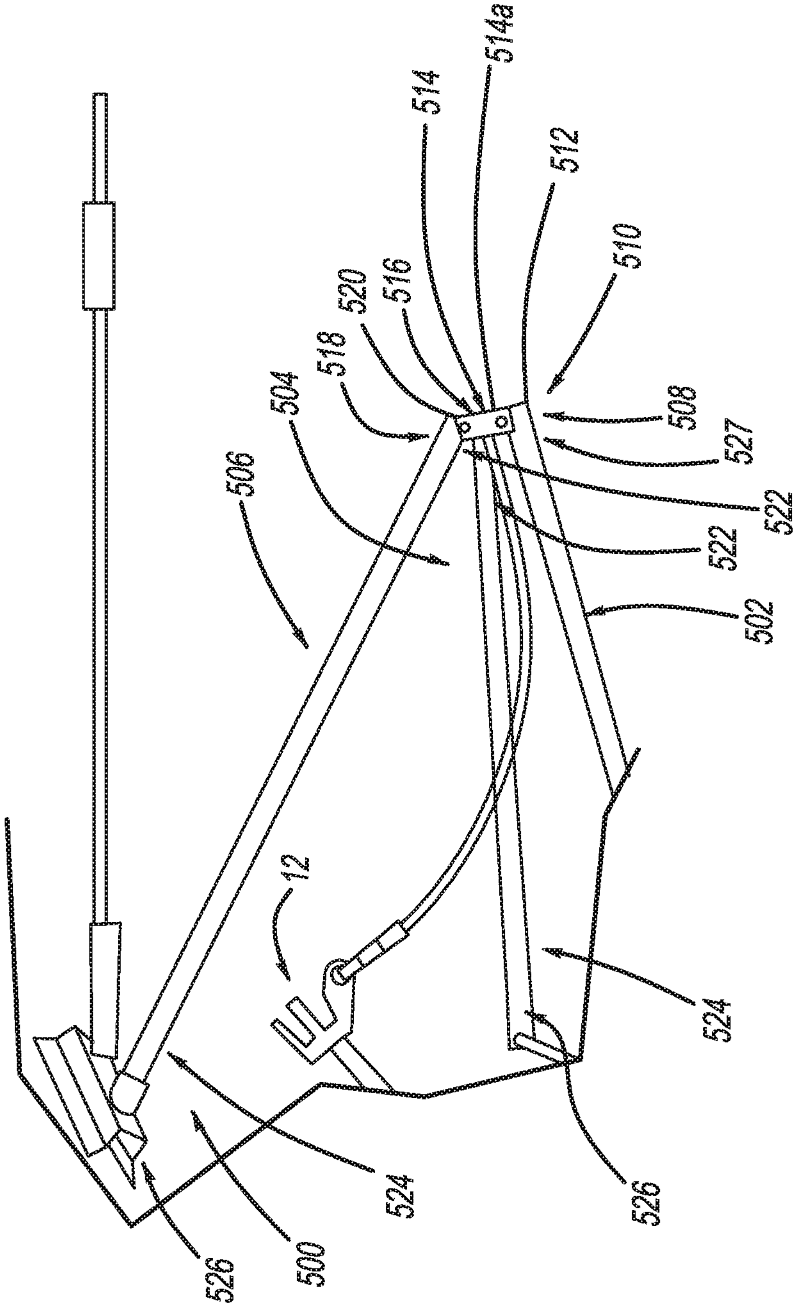
FIG. 24A is a perspective view of a remote access pull rig for use with a fuse of a power distribution system in accordance with the present disclosure, in which the remote access pull rig is in a first, extended position.

With reference now to FIG. 24A, a remote access pull rig is shown to include a rig assembly 500. As the rig assembly 500 can be similar to the rig assembly 32 discussed with regard to FIGS. 1-14, only the differences between the rig assembly 500 and the rig assembly 32 will be discussed in detail herein the same reference numerals used to denote the same or substantially similar components. The rig assembly 500 can be employed with the rope 34, handle 36 (not shown) and shake-proof hook 20, and coupled to the box 142 of the power distribution system 14 to provide leverage to move the fuse 12 between the first position and the second position.

Figure 25:
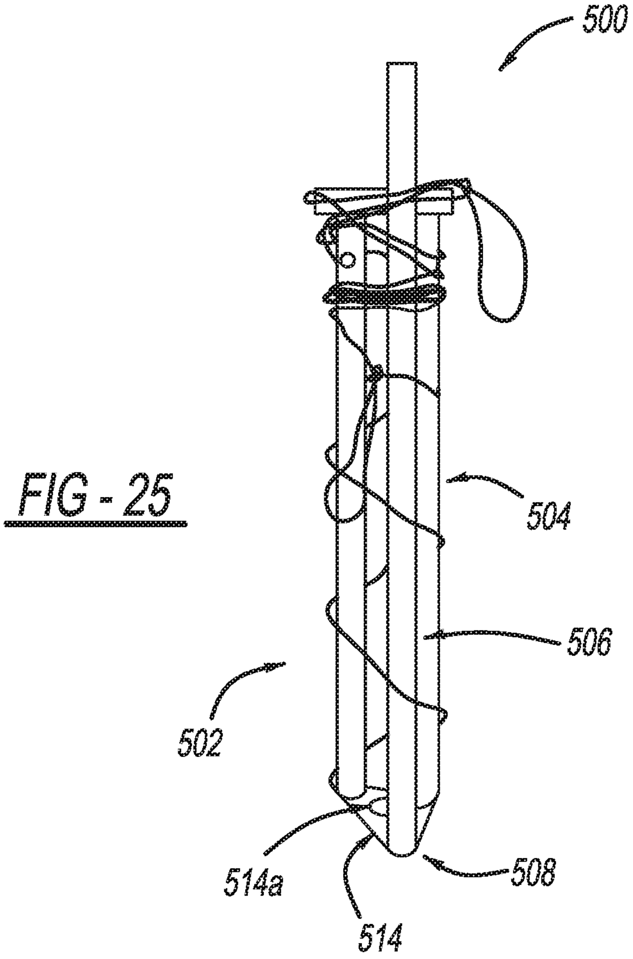
FIG. 25 is a perspective view of the remote access pull rig of FIG. 24A, in which the remote access pull rig is in a second, collapsed position.

The rig assembly 500 includes a first leg assembly 502, a second leg assembly 504, a third leg assembly 506 and a mounting bracket 508. The mounting bracket 508 is substantially L-shaped. A first flange 510 of the mounting bracket 508 defines a cavity 512 for receipt of the first leg assembly 502. The first leg assembly 502 may be coupled to the cavity 512 via one or more fasteners, such as bolts, screws, etc. The first flange 510 also defines a rope funnel 514 and a second cavity 516. The rope funnel 514 defines a throughbore 514*a* for receipt of the rope 34 therethrough. The second leg assembly 504 may be coupled to the second cavity 516 via one or more fasteners, such as bolts, screws, etc. A second flange 518 defines a third cavity 520 for receipt of the third leg assembly 506. The third leg assembly 506 may be coupled to the third cavity 520 via one or more fasteners, such as bolts, screws, etc. Generally, the first leg assembly 502, the second leg assembly 504 and the third leg assembly 506 are coupled to the mounting bracket 508 so as to be movable between a first, extended position (FIG. 24A) and a second, collapsed position (FIG. 25) to assist in transporting the rig assembly 500.

Figure 24B:
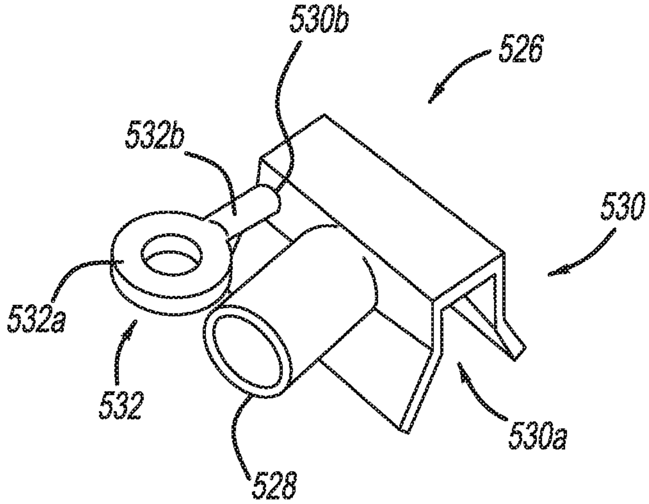
FIG. 24B is a detail view of a clamp for use with the remote access pull rig of FIG. 24A.

Each of the first leg assembly 502, the second leg assembly 504 and the third leg assembly 506 are substantially cylindrical in shape, and may be composed of a suitable electrically insulating material, such as fiberglass. In example, the first leg assembly 502, the second leg assembly 504 and the third leg assembly 506 comprise fiberglass tubes, however, the first leg assembly 502, the second leg assembly 504 and the third leg assembly 506 may be composed of a suitable polymer. The first leg assembly 502, the second leg assembly 504 and the third leg assembly 506 each include a first end 522 coupled to the mounting bracket 508 via one or more mechanical fasteners and a second end 524. Each of the second ends 524 includes a threaded clamp 526. The threaded clamp 526 clamps onto a portion of the box 142 to couple the rig assembly 500 to the box 146. In one example, with reference to FIG. 24B the threaded clamp 526 includes a tubular portion 528, a sill engagement portion 530 and a fastener 532. In this example, the tubular portion 528 is coupled to the respective second end 524 to secure the threaded clamp 526 to the respective one of the first leg assembly 502, the second leg assembly 504 and the third leg assembly 506. For example, the tubular portion 528 is press-fit onto the second end 524, but one or more mechanical fasteners, welding, etc. may be used to couple the threaded clamp 526 to the second end 524. The sill engagement portion 530 is sized and shaped to fit over the sill 140 of the box 142 to couple the threaded clamp 526 to the sill 140. In this example, the sill engagement portion 530 defines a channel 530*a* for receipt of the sill 140. It should be noted that one or more of the threaded clamps 526 may be configured slightly differently. For example, the threaded clamp 526 associated with the third leg assembly 506 may define a channel with a smaller width to fit onto an upper sill associated with the box 142.

The fastener 532 extends through a bore 530*b* defined in the sill engagement portion 530. In this example, the fastener 532 includes a eyelet 532*a* coupled to a threaded shaft 532*b*. The advancement of the fastener 532 towards the sill 140 causes the fastener 532 to apply a clamping force to the sill 140, thereby clamping the first leg assembly 502, the second leg assembly 504 and the third leg assembly 506 to the box 142.

As one of ordinary skill in the art would understand based on the description contained herein how to assemble and use of the rig assembly 500, the assembly and use of the rig assembly 500 will not be discussed in great detail herein. Briefly, however, with the rig assembly 500 in the collapsed position (FIG. 25), the first leg assembly 502 and the second leg assembly 504 may be moved into the first, extended position and tightened in the mounting bracket 508 to secure their relative positions, as shown in FIG. 24A. The rope 34 may be inserted through the rope funnel 514. The first end 34*a* of the rope 34 may be tied to the shake-proof hook 20, and the second end may be tied to the handle (not shown). With the shake-roof hook 20 coupled to the fuse 12, the rig assembly 500 may be used to provide leverage to open the fuse 12.

Figure 26:
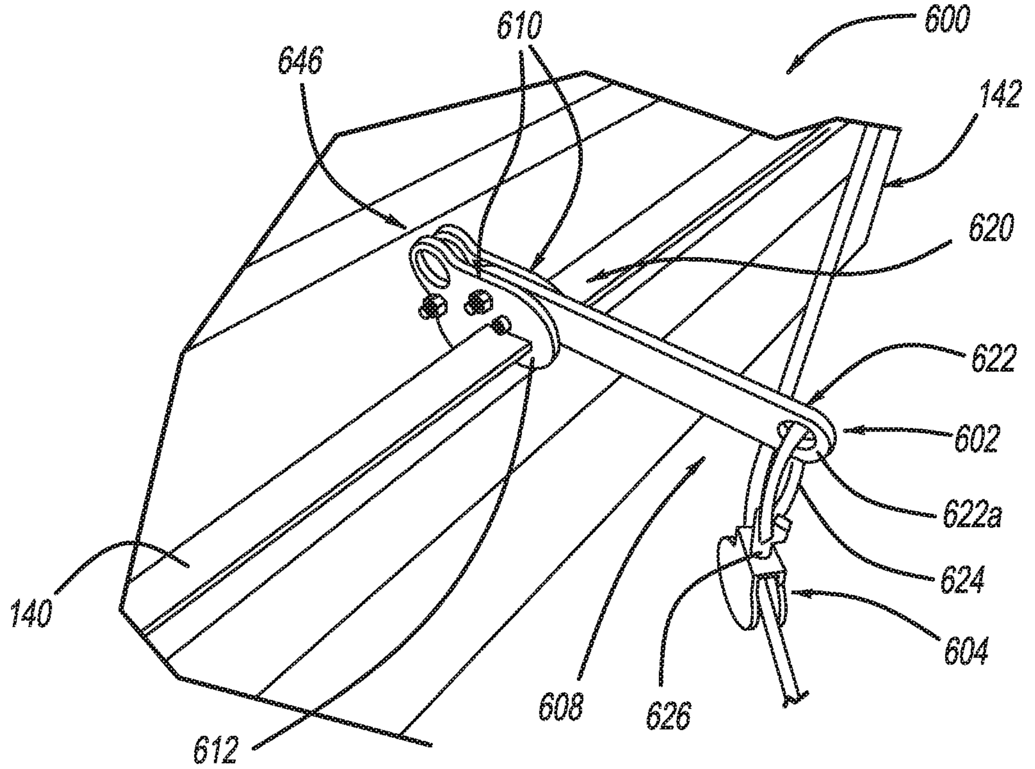
FIG. 26 is a perspective view of a remote access pull rig for use with a fuse of a power distribution system in accordance with the present disclosure.

With reference now to FIG. 26, a remote access pull rig 600 is shown. As the remote access pull rig 600 can be similar to the remote access pull rig 10 discussed with regard to FIGS. 1-14, only the differences between the remote access pull rig 600 and the remote access pull rig 10 will be discussed in detail herein the same reference numerals used to denote the same or substantially similar components. The remote access pull rig 600 can be employed with the rope 34, handle 36 (not shown) and the shake-proof hook 20, and coupled to the box 142 of the power distribution system 14 to provide leverage to move the fuse 12 between the first position and the second position.

Figure 27:
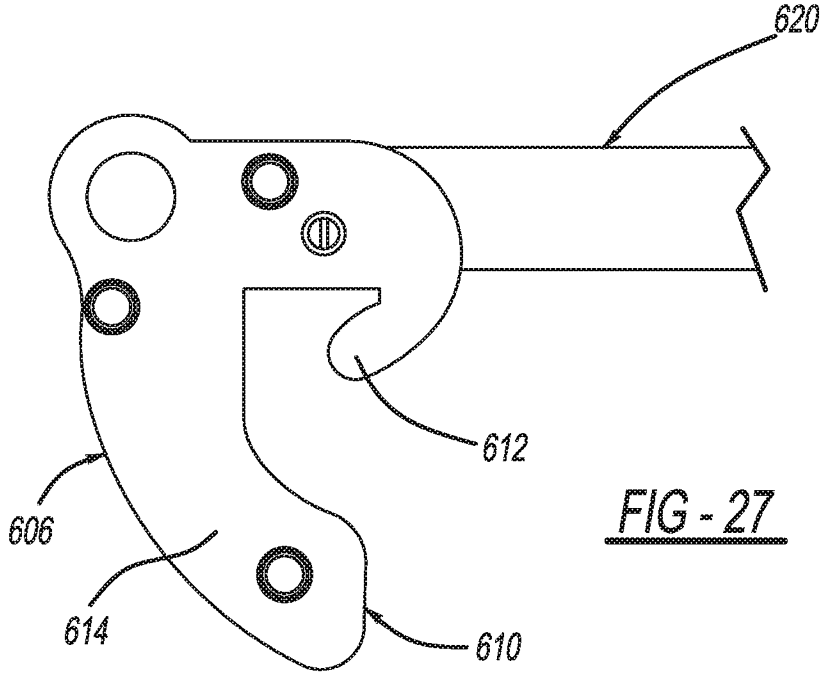
FIG. 27 is a detail view of a portion of a clamp associated with the remote access pull rig of FIG. 26.

In this example, the remote access pull rig 600 includes a clamp 602 and a pulley 604. The clamp 602 may be coupled to the sill 140 of the box 142 to provide leverage for moving the fuse 12. Generally, the clamp 602 is composed of a metal or metal alloy, but the clamp 602 may be composed of a suitable polymeric material. The clamp 602 includes a clamp portion 606 and an arm 608. With additional reference to FIG. 27, the clamp portion 606 includes two substantially C-shaped flanges 610. Each of the flanges 610 may include a lip 612, which may be coupled under the sill 140. The remainder of the flange 610 may be positioned about the sill 140 such that a lower portion 614 of the flanges 610 is positioned within the box 142. Thus, the lower portion 614 may brace against an inner surface of the box 142, while the lip 612 couples the clamp 602 to the sill 140. It should be noted that while the clamp 602 is illustrated herein as having two flanges 610, the clamp 602 may include a single flange 610, if desired. The flanges 610 may be coupled to the arm 608 via one or more fasteners, such as bolts and nuts.

The arm 608 includes a first end 620 and a second end 622. The first end 620 is coupled to the flanges 610 of the clamp portion 606, and thus, may define one or more bores for receipt of the fasteners therethrough to couple the clamp portion 606 to the arm 608. The second end 622 defines an aperture 622*a*, which couples the pulley 604 to the arm 608.

The pulley 604 is coupled to the arm 608 via a D-ring 624. The pulley 604 can comprise any suitable pulley that cooperates with the rope 34 such that the rope 34 may move through the pulley 604. In this example, the pulley 604 includes an eyelet hook 626, which is coupled to the D-ring 624. The D-ring 624 is received in the aperture 622*a* of the arm 608 and thereby couples the pulley 604 to the clamp 602.

With the pulley 604 coupled to the clamp 602, and the clamp 602 coupled to the sill 140, the rope 34 may be coupled to the shake-proof hook 20 and threaded through the pulley 604. The handle 36 (not shown) may be coupled to the rope 34. The operator located remotely from the box 142 may apply a force to the handle 36 to pull the rope 34 through the pulley 604, and thus, move the fuse 12 to the open position while the clamp 602 provides leverage against the box 142. Thus, the remote access pull rig 600 provides leverage to enable the fuse 12 to move to the open position.

Figure 28:
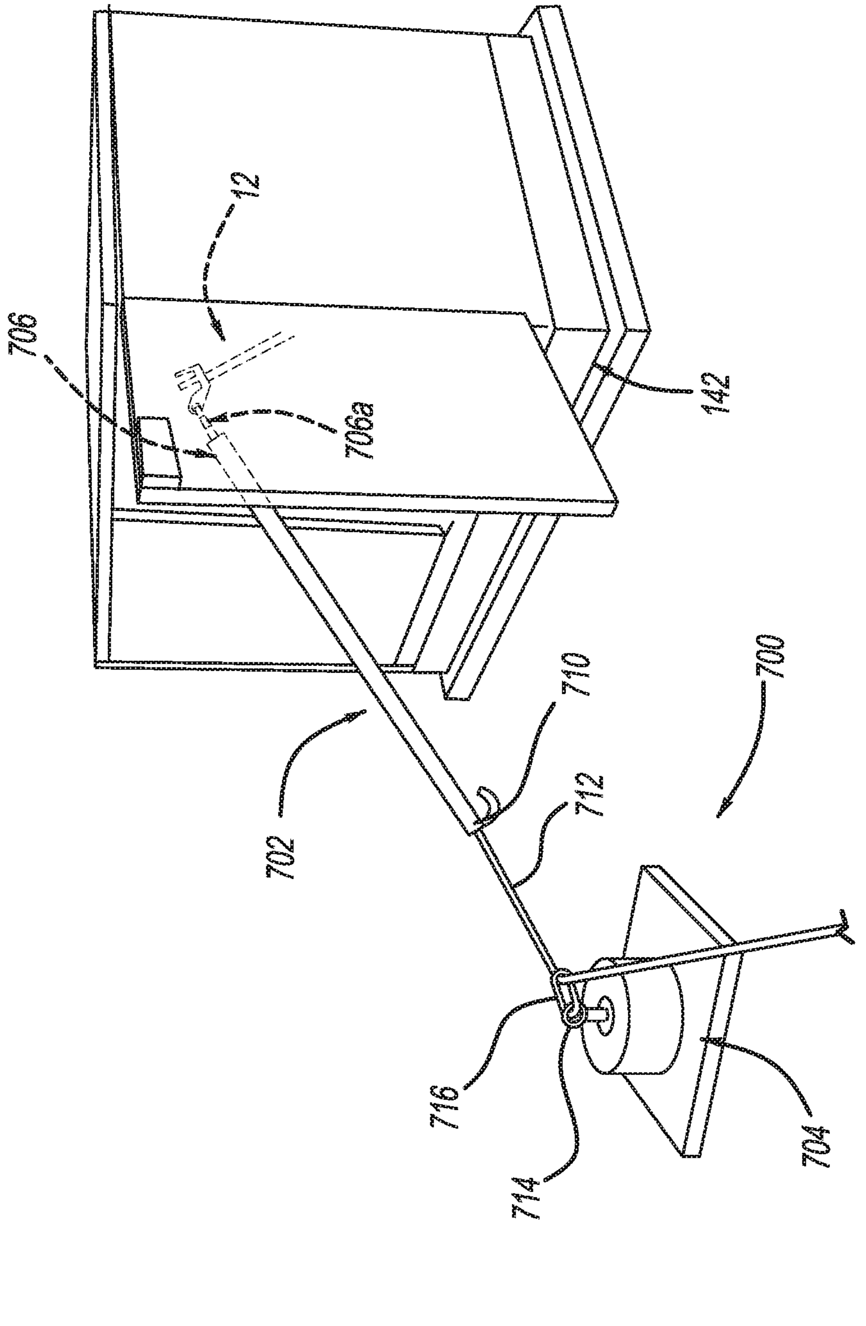
FIG. 28 is a perspective view of a remote access pull rig for use with a fuse of a power distribution system in accordance with the present disclosure.

With reference now to FIG. 28, a remote access pull rig 700 is shown. As the remote access pull rig 700 can be similar to the remote access pull rig 10 discussed with regard to FIGS. 1-14, only the differences between the remote access pull rig 700 and the remote access pull rig 10 will be discussed in detail herein the same reference numerals used to denote the same or substantially similar components. The remote access pull rig 700 can be employed with the rope 34, handle 36 (not shown) and the shake-proof hook 20, and coupled to the box 142 of the power distribution system 14 to provide leverage to move the fuse 12 between the first position and the second position.

In this example, the remote access pull rig 700 includes a linkage 702 and a weight 704. The linkage 702 is generally composed of an electrically insulating material, and in one example, is composed of fiberglass. One end 706 of the linkage 702 includes a hook 706*a*, which hooks onto the fuse 12. The other, opposite end 710 of the linkage 702 is coupled to a rope 712.

The weight 704 is positioned spaced apart from the box 142 and includes an eyelet hook 714. The eyelet hook 714 is coupled to a pulley 716. The pulley 716 defines an opening through which the rope 712 may pass. The rope 712 may be grasped by an operator and pulled to move the linkage 702 relative to the weight to move the fuse 12 to the open position. In one example, the weight 704 is about 100 pounds, but any suitable weight may be employed.

Figure 29:
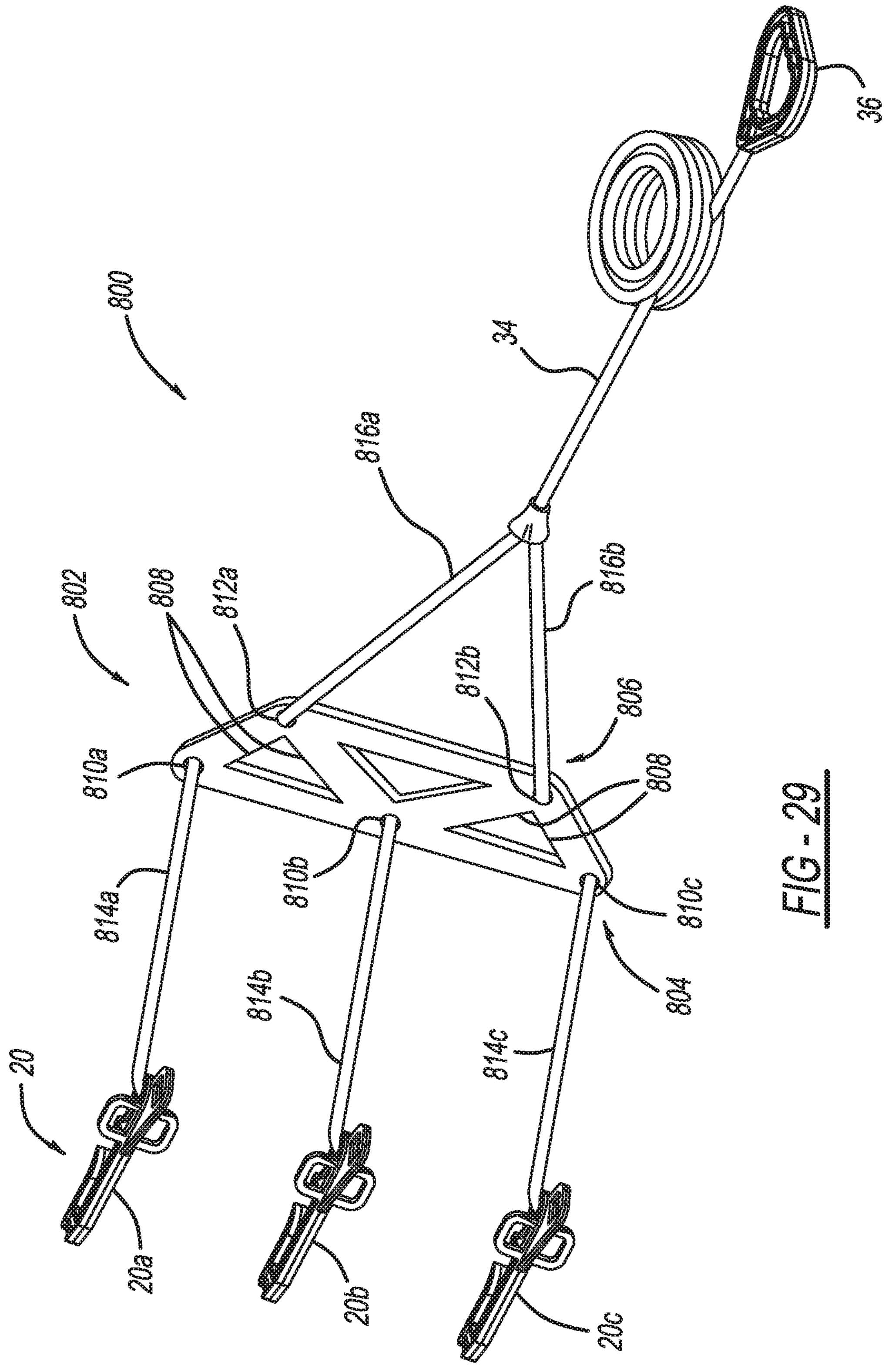
FIG. 29 is a perspective view of a remote access pull rig for use with a fuse of a power distribution system in accordance with the present disclosure.

With reference now to FIG. 29, a remote access pull rig 800 is shown. As the remote access pull rig 800 can be similar to the remote access pull rig 10 discussed with regard to FIGS. 1-14, only the differences between the remote access pull rig 800 and the remote access pull rig 10 will be discussed in detail herein the same reference numerals used to denote the same or substantially similar components. The remote access pull rig 800 can be employed with the rope 34, handle 36 and the shake-proof hook 20 to provide leverage to move the fuse 12 between the first position and the second position. It should be noted that while the remote access pull rig 800 is illustrated herein with a plurality of ropes 34, 814, 816 and a single handle 36, the remote access pull rig 800 may be used in conjunction with a plurality of ropes 34 each coupled a respective one of a plurality of handles 36.

In this example, the remote access pull rig 800 enables multiple fuses 12 to be opened. In this regard, the remote access pull rig 800 comprises a bracket 802, which may be composed of a suitable electrically insulating material, such as a polymer. The bracket 802 may be monolithic or one-piece. The bracket 802 has a generally trapezoidal shape, and includes a first leading edge 804 and a second trailing edge 806. One or more supports 808 may be defined between the first leading edge 804 and the second trailing edge 806 for stability. The first leading edge 804 defines a plurality of bores 810, which enable a portion of a rope 814*a*, 814*b*, 814*c* to pass therethrough. The plurality of bores 810 includes bores 810*a*, 810*b*, 8120*c*. The second trailing edge 806 includes a plurality of bores 812, which enables a portion of a rope 816*a*, 816*b* to similarly pass therethrough. The plurality of bores 812 includes bores 812*a*, 812*b*. The rope 814*a*-814*c* and the rope 816*a*-816*b* may comprise any suitable rope, and in one example, comprises about ⅜ inches thick 8 strand plaited bi-polymer dielectric rope. For example, the rope 814*a*-814*c* and the rope 816*a*-816*b* comprises Hy-Dee Brait dielectric rope commercially available from Yale Cordage of Saco, Me.

In one example, with the bracket 802 formed, the remote access pull rig 800 may be used to open a plurality of fuses 12 (FIG. 1). In this example, a plurality of shake-proof hooks 20 are coupled to a respective one of the plurality of fuses 12 (FIG. 1). The rope 814*a* is coupled to a first shake-proof hook 20*a*, via tying for example, and the rope 814*b* is coupled to a second shake-proof hook 20*b*, via tying for example. The rope 814*c* is coupled to the third shake-proof hook 20*c*, and each of the rope 814*a*, rope 814*b* and the rope 814 are coupled to respective ones of the bores 810*a*-810*c*, via tying for example. In one example, the rope 816*a* is coupled to the bore 812*a*, via tying for example, and the rope 816*b* is coupled to the bore 812*b*, via tying for example. The ropes 816*a*, 816*b* are each coupled to the rope 34 associated with the handle 36 via tying, adhesives, etc. With the ropes 816*a*, 816*b* coupled to the handle 36, the operator may grasp the handle 36 and apply a force thereto to move the plurality of fuses 12 to the opened position.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A remote access pull rig for opening a fuse associated with a power distribution system, comprising:

a base including a rope funnel adapted to receive a rope coupled to the fuse;

a first leg coupled to the base, the first leg including a first clamp;

a second leg coupled to the base, the first leg and the second leg extending along a longitudinal axis of the remote access pull rig, the second leg including a second clamp; and an arm that extends along an axis transverse to the longitudinal axis, the arm coupled to the base such that a position of the arm is adjustable along the axis, and the arm includes a third clamp, wherein the first clamp includes a pad coupled to the first leg, a link plate coupled to the pad and a clamp foot pivotably coupled to the link plate.

2. The remote access pull rig of claim 1, wherein the first clamp includes a first handle, and the first handle is coupled to the link plate and is coupled to the clamp foot via at least one linkage, the first handle movable to pivot the clamp foot relative to the first leg.

3. A remote access pull rig for opening a fuse associated with a power distribution system, comprising:

a base including a rope funnel adapted to receive a rope coupled to the fuse, the rope funnel removably coupled to the base;

a first leg coupled to the base, the first leg including a first clamp and a pad positioned between the first leg and the first clamp;

a second leg coupled to the base, the first leg and the second leg extending along a longitudinal axis of the remote access pull rig, the second leg including a second clamp and a second pad, the second pad coupled to the first leg, and the second clamp includes a first handle, a link plate and a clamp foot, the first handle coupled to the link plate and coupled to the clamp foot via a link, the link plate coupled to the second pad and the clamp foot pivotably coupled to the link plate such that movement of the handle pivots the clamp foot, the clamp foot including an indentation that forms a line of contact for the application of a clamp force; and an arm that extends along an axis transverse to the longitudinal axis, the arm coupled to the base such that a position of the arm is adjustable along the axis, and the arm includes a third clamp, the third clamp having a second handle that extends through a slot defined in the arm.

* * * * *